US010062100B2

(12) United States Patent
Alvarez et al.

(10) Patent No.: US 10,062,100 B2
(45) Date of Patent: Aug. 28, 2018

(54) METHODS AND SYSTEMS FOR IDENTIFYING VISITORS TO REAL-WORLD SHOPPING VENUES AS BELONGING TO A GROUP

(71) Applicant: Adobe Systems Incorporated, San Jose, CA (US)

(72) Inventors: Tobias Martin Bocanegra Alvarez, San Francisco, CA (US); Martin Buergi, Foster City, CA (US); Cedric Huesler, San Jose, CA (US); Sachin Soni, New Dehli (IN); Ashish Duggal, Delhi (IN); Anmol Dhawan, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 477 days.

(21) Appl. No.: 14/864,446

(22) Filed: Sep. 24, 2015

(65) Prior Publication Data
US 2017/0091850 A1   Mar. 30, 2017

(51) Int. Cl.
*G06Q 30/00*  (2012.01)
*G06Q 30/06*  (2012.01)
*H04W 4/04*  (2009.01)
*H04B 5/00*  (2006.01)
*G06Q 50/00*  (2012.01)

(52) U.S. Cl.
CPC ......... *G06Q 30/0633* (2013.01); *G06Q 50/01* (2013.01); *H04B 5/0062* (2013.01); *H04W 4/04* (2013.01)

(58) Field of Classification Search
CPC .......... G06Q 30/0633; G06Q 30/0613; G06Q 50/01; H04B 5/062; H04B 5/0062

USPC ............................................. 705/26.41, 26.1
See application file for complete search history.

(56) References Cited

U.S. PATENT DOCUMENTS

2002/0042751 A1* 4/2002 Sarno ................. G06Q 30/0601
705/26.1

FOREIGN PATENT DOCUMENTS

JP       2009237993 A  * 10/2009  ............. G08B 13/00

OTHER PUBLICATIONS

2009-P81853, Mar. 2008, Derwent, Takada N.*

(Continued)

*Primary Examiner* — Yogesh C Garg
(74) *Attorney, Agent, or Firm* — Kilpatrick Townsend & Stockton LLP

(57) ABSTRACT

Techniques disclosed herein identify visitors who visit a real-world shopping venue as belonging to a group. This involves tracking a physical action of a visitor present at the real-world shopping venue and identifying the visitor based on the tracked physical action and previously collected visitor information associated with the venue. The visitor is determined to be a member of a group based on the previously collected visitor information. Based on determining that the visitor is a member of the group, a notification is sent to another member of the group. The notification identifies that the visitor has placed at least one item in a sharing cart while the visitor is present at the real-world shopping venue. A system determines that visitors who routinely visit a real-world shopping venue belong to a group based on their activities while visiting the venue, and allows the visitors to provide feedback to each other.

20 Claims, 7 Drawing Sheets

(56) References Cited

OTHER PUBLICATIONS

"Moving Cameras Talk to Each Other to Identify, Track Pedestrians", Targeted News Service [Washington, D.C] Nov. 12, 2014, extracted from ProQuest Dialog on Apr. 28, 2018.*

* cited by examiner

METHODS AND SYSTEMS FOR IDENTIFYING VISITORS TO REAL-WORLD SHOPPING VENUES AS BELONGING TO A GROUP

TECHNICAL FIELD

This disclosure relates generally to computer-implemented methods and systems for identifying visitors to a shopping venue, and more particularly relates to techniques for determining if visitors to a real-world shopping venue such as a store belong to a group such as a family or couple.

BACKGROUND

In a real-world shopping venue, such as a brick-and-mortar store, there can be one or more electronic displays for displaying information to patrons, customers, shoppers, guests, or other visitors. Such displays can be large screens mounted in locations that are readily visible, such as above entrances or aisles, near store shelves or product displays, on walls, or in other suitable locations. The displays can be included in embedded devices that are used for a variety of purposes, such as digital signage, product images, advertising, and providing various other forms of information that may be of interest to the visitors. Marketers can benefit from identifying whether visitors to an open environment such as a store belong to the same group (e.g., are in the same family or couple). Shopping is often a family activity. However, stores are often unable to provide a family-friendly/couple-friendly shopping experience because retailers lack sufficient information to enhance the experience for couples and families visiting their stores.

In contrast to online shopping environments, brick-and-mortar stores and other real-world shopping venues lack means to readily identify customers as belonging to a group such as a family. As a result, real-world shopping venues do little or nothing to facilitate customer-to-customer communications to encourage recommendations and collaborative shopping between group members.

It is desirable to identify visitors to a real-world shopping venue as belonging to the same group, such as a family or couple. Efficient identification of such visitors can increase visitor responsiveness to products presented to the visitors while the visitors are in the real-world shopping venue (e.g., while family members are shopping in a store).

SUMMARY

Systems and methods disclosed herein identify visitors who visit a real-world shopping venue as belonging to a group. This involves tracking a physical action of a visitor present at the real-world shopping venue and identifying the visitor based on the tracked physical action and previously collected visitor information associated with the venue. The visitor is determined to be a member of a group based on the previously collected visitor information. Based on determining that the visitor is a member of the group, a notification is sent to another member of the group. The notification identifies that the visitor has placed at least one item in a sharing cart while the visitor is present at the real-world shopping venue.

Another embodiment determines that visitors who routinely visit a real-world shopping venue together belong to a group based on their activities while visiting the real-world shopping venue. The visitors carry mobile devices connected to a communication network. This embodiment allows the visitors to seek and provide feedback to each other via an interface while they are present at the real-world shopping venue. The interface can be presented on in-store interactive display screens at the real-world shopping venue or via an interface of an application installed on the mobile devices.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
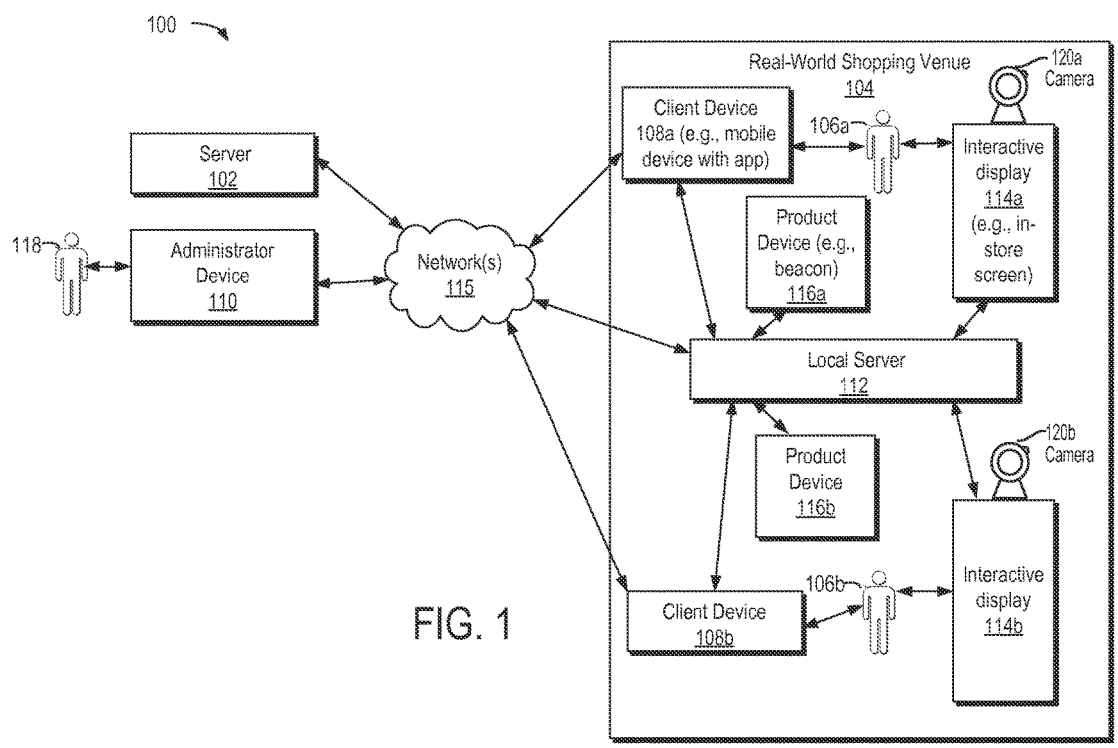
FIG. 1 is a block diagram of a system for identifying visitors shopping at real-world shopping venues while carrying or interacting with electronic devices, in accordance with an embodiment of the present invention.

As described above, in contrast to online shopping environments, brick-and-mortar stores and other real-world shopping venues are not able to identify visitors as belonging to a group such as a family, a household, or a couple. The lack of being able to identify visitors as being members of a group prevents real-world shopping venues from facilitating electronic-based interactions between the visitors while they are shopping in the venues, and do little or nothing to facilitate visitor-to-visitor communications to encourage collaborative shopping and recommendations amongst members of a group (e.g., between family members or spouses). The invention herein utilizes mobile electronic devices carried by visitors and devices otherwise interacted with by visitors while shopping in a real-world shopping venue to identify the visitors as belonging to a group and to enable group members to provide feedback to each other while shopping in different sections in the venue. Information about visitors' past in-store activities (e.g., physical actions in the venue such as movement patterns, handling of particular products, etc.) is used to identify those visitors as being part of a cohesive group.

One embodiment identifies visitors who routinely visit a real-world shopping venue as belonging to a group such as a family or a couple. Visitors are identified as being members of a group based on their activities while visiting the venue. Once identified as being group members, the venue can provide an interface to the visitors so that they can seek and provide feedback to each other while shopping in the venue. The group members can interact with each other via the interface to recommend or approve items to be purchased in the venue. The interface can be provided by a content management tool, such as, for example, Adobe® Experience Manager.

Another embodiment determines if visitors to a real-world shopping venue are part of a cohesive group based on data from the visitors' past in-store activities. After identifying the visitors as being members of a cohesive group (e.g., a family, a household, or a couple), on their next visit together to the venue (e.g., next trip to the store), the members are provided with an interface that allows them to ask for and provide feedback to each other while shopping in different sections of the venue. This embodiment can include the following steps: (1) identify people who have visited a real-world shopping venue (e.g., a store) as constituting a group (e.g., a couple, a household, or a family); (2) determine whether a shopper currently visiting the store (either alone or with others) is a member of the group; and (3) provide an interface that presents content to the visitor based on the visitor being a member of the group. For example, if a couple is in a store, a female member of the couple may go to a female apparel section of the store, and the male may go to a male apparel section of the store. In this example, the male member of the couple can interact with the interface view or explore dresses on an in-store display screen while sharing these items with his female partner who is also in the store. In this way, the male can get his female partner's feedback on the items (e.g., dresses) while the two members of the couple are in different sections of the store and interacting with separate in-store display screens. Examples of such in-store display screens are provided FIGS. 1, 4, and 5. The content (e.g., images of the dresses and information about the dresses) on the in-store display screens can be rendered by a content management tool. In one example, the content management tool can be Adobe® Experience Manager.

In another embodiment, a system includes a content management tool configured to present an interface to store visitors via an interactive, in-store display screens. Based on detected in-store activities and visitor profiles, the system can determine that a visitor has come to a store with his female partner. The in-store activities can be detected using Internet of things (IoT) devices, such as, for example, sensors, beacons (including one or more static beacons, beacon stickers, and mobile beacons), embedded touchscreens, Global Positioning System (GPS) devices, radio-frequency identification (RFID) tags, webcams, mobile computing devices (e.g., tablets and smartphones), and other IoT devices that can be present in the store. For example, the visitor may be holding apparel/clothing items in his hand and images of these items captured by an in-store camera can be used to identify these items as being items in the store's catalogue. In this example, an automatic camera-based clothing pattern recognition or assistive clothing pattern recognition technique can be used to detect shapes of clothes the visitor is holding or wearing and identify these items by correlating the detected clothes shapes to catalogue items. For instance, if the visitor is holding a pair of jeans in front of an in-store display screen, a camera integrated into the screen or mounted near the screen can capture an image of the jeans. At this point, the system can detect the shape and color of the jeans in the captured image using a clothing pattern recognition technique, and then identify a catalogue item corresponding to the jeans. The system allows the visitor to then share these identified items with his female partner when she interacts with another display screen (e.g., a screen located elsewhere in the store or a screen of her mobile device).

The system can present an "add to sharing cart" option to a male visitor as he explores various items on a first screen in the store. While the visitor is exploring items using the first screen, he can: (a) add items that he likes to his sharing cart; (b) drag and drop the added items added to the sharing cart to reflect his ranking or preference for the items; and (b) press or select a share button so that the system sends a push notification to another member of his group (e.g., his female partner or wife) prompting the other member to go to a nearby in-store screen (i.e., a second screen in a section of the store where the other member is shopping). In this example, when the other member of the group views the nearby in-store screen, a camera associated with that screen can be used to identify this person as the female partner of the male who shared an item via the first screen. The female partner can interact with the nearby screen to provide her feedback. For instance, the nearby in-store screen can show the female partner shortlisted shirts selected by her male partner, and the female partner can provide her feedback by reordering the shirts onscreen or adding comments pertaining to individual shirts in the male partner's sharing cart. Such feedback for products and items can be sent to the male partner to that he can see the feedback on the first in-store screen (e.g., the screen near the male partner).

As the male visitor adds a product (e.g., a pair of shoes) to his sharing cart, an embodiment sends a push notification to the female partner informing her about the product added to the cart by her male partner. The notification can also indicate corresponding matching items to suggest to the female as specified by a marketer or the store. For example, matching sandals corresponding to the shoes added to the cart by male can be presented on an in-store screen near the female partner. The female partner can interact with the nearby screen to explore the corresponding matching items suggested to her.

Another embodiment identifies visitors who routinely visit a real-world shopping venue (e.g., a brick-and-mortar store) as being part of the same cohesive group based on data from their in-store activities. The data can include tracked physical actions such as previous visits to a store together with other members of the group. In certain embodiments, the cohesive group can be one or more of a couple, a family, or a household (e.g., a group of housemates or roommates). After identifying a group of visitors as being members of the group, on their next visit together to the real-world shopping venue (e.g., the store), an end-user experience is provided to the visitors even when they are physically shopping in different sections of the real-world shopping venue (e.g., different locations within the store). This experience includes a user interface that enables a family member to ask for another family member's feedback on a certain item. The interface enables other family members to explore this item in full fidelity on an in-store screen (see, e.g., in-store screens 414a and 414b in FIG. 5) so as to enable them to provide valuable feedback. For instance, the interface can suggest matching items to a male member of the group based on what is in the cart of his female partner.

Numerous benefits are provided by the techniques disclosed herein. By automatically determining if a customer who is already in a real-world shopping venue is a member of a group, providing an interactive interface at an in-store screen accessible by the customer, and obtaining feedback from another member of the group regarding items in the customer's cart, the customer's shopping experience is improved, and the likelihood of a purchase is increased.

The information about a customer's physical actions while in a real-world shopping venue can also provide valuable brand interest information. An example system is able to identify products of a given brand that are of interest to a customer based on the customer's actions. The system can optimize which products are displayed to a customer to both solicit feedback from group members and to pitch products related to the customer's interests. For example, if a customer spent a significant amount of time in the sportswear department of a store and then came to a particular brand's section in the sportswear department, the system may present sportswear items from that brand on an in-store display in the brand's section.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the terms "visitor", "shopper", "person", "customer", and "user" refer to any to any person that shops for, browses, buys, rents, or uses goods or services offered at a real-world shopping venue. A visitor to a real-world shopping venue can interact with a screen of a digital signage device in the venue, and an image of the visitor can be captured by a camera associated with the digital signage device. The image includes the visitor, items held or worn by the visitor (e.g., apparel items, glasses, ties, hats, accessories, et al.), and other items or products held or carried by the visitor (e.g., shoes, sports equipment, bags, purses, and luggage).

As used herein, the term "group" refers to any cohesive group of people. A group can include a couple (e.g., spouses), a family, or a household. For example, group members can be housemates or roommates sharing the same house or apartment. Group members can be people who have visited or shopped at a real-world shopping venue alone or with other people belonging to the group.

As used herein, the phrase "real-world shopping venue" refers to a physical location where products or services are offered to customers. A customer present at a real-world shopping venue is at the real-world shopping venue in person. For example, a person walking through the aisles of a store is a visitor to a real-world shopping venue who is present at the venue. As another example, a person testing items in an outdoor market is present at a real-world shopping venue. Online stores are not real-world shopping venues. Thus, a person using a desktop or laptop computer at the person's residence to shop for products by accessing a webpage is not present in real-world shopping venue. A real-world shopping venue can be a brick-and-mortar store, a retail store, a department or section within a store, an area of an airport where products are sold (e.g., a duty free shop), a public transit station, a retail kiosk or stand, a music or sports venue where merchandise is sold, a museum gift shop, or any other customer-accessible location where products or services are offered to customers.

As used herein, the phrases "interactive display", "in-store screen" and "digital signage device" refer to any computing device configured to display electronic content and interact with customers in a real-world shopping venue. In one embodiment, a digital signage device has a display device (e.g., a screen such), an input device (e.g., a touchscreen, pointing device, mouse, microphone, or keyboard), and hosts a browser. The browser can display electronic content from a web server. The electronic content can include descriptions of products, product images, three-dimensional (3D) models of products, and product videos. In some embodiments, digital signage devices can be embedded devices at a location in the real-world shopping venue such as, for example, information kiosks, wall-mounted devices, customer service counters, or table-mounted devices at locations in a store.

As used herein, the phrase "mobile device" refers to a portable electronic computing device such as a smartphone, a tablet, a laptop, a watch, a wearable electronic device, and other similar devices.

As used herein, the terms "electronic content", "content", "website content," and "digital content" refer to any type of resource or media that can be rendered for display on computing devices. Electronic content can include text or multimedia files, such as images, 3D graphics, video, audio, or any combination thereof. Electronic content can include digital signage content, product images, 3D product models, and website content. Electronic content can also include application software that is designed to perform one or more specific tasks at a computing system or computing device. Computing devices include servers, client devices, and mobile devices such as, but not limited to, servers, desktop computers, laptop computers, smartphones, video game consoles, smart televisions, tablet computers, portable gaming devices, personal digital assistants (PDAs), etc. Electronic content can be streamed to, downloaded by, and/or uploaded from computing devices. Electronic content can include multimedia hosted on web sites, such as Internet web sites, intranet web sites, standard web pages, or mobile web pages specifically formatted for display on mobile computing devices. Electronic content can also include application software developed for computing devices that is designed to perform one or more specific tasks at the computing device.

As used herein, the terms "application" and "app" refer to any program configured to access and retrieve information hosted on a computing system (e.g., content from a store's web site hosted on a server, a content management system, and/or a content delivery system) and to render the information at a user interface. Examples of such applications include a content management tool, a web browser, a mobile application (e.g., a store's mobile app), a script or a plug-in that runs within a web browser, a program that is hosted in a web browser, a program that is separate from but that interfaces with a web browser such as retailer's or store's mobile app, and other types of programs capable of using local memory and a rendering engine to access and render electronic content.

As used herein, the phrase "sharing cart" refers to virtual shopping cart that a customer can populate with items to be shared with other customers in the customer's group. The sharing cart can be populated with products from a real-world shopping venue.

As used herein, the phrase "physical action" refers to any activity performed by a person in the real-world that results in the person or an object moving, bending, stretching, shifting, leaning, rotating, entering or remaining in a location, excluding activities that provide input to or control electronic device user interfaces. Examples of physical actions include, but are not limited to, entering a real-world shopping venue, standing or sitting in a location for a period of time, moving from one location to another location, moving in a pattern, picking up a product, handling a product for a period of time, placing a product in a shopping cart, remaining in a real-world shopping venue for a period of time, leaving a real-world shopping venue, entering a section of a real-world shopping venue, leaving a section of a real-world shopping venue, and remaining in a section of a real-world shopping venue for a period of time. Interactions to provide input or control electronic device user interfaces (e.g., via touchscreen, keyboard, mouse, voice command, etc.) are not physical actions for purposes of this patent. Accordingly, sending an e-mail, placing items in a virtual sharing cart, prioritizing items in a sharing cart, soliciting or providing feedback regarding items in a sharing cart, making an online purchase, and other such computing actions are not physical actions.

Example System

FIG. 1 illustrates an example system for identifying and assisting customers shopping at real-world shopping venues while carrying or interacting with electronic devices. In particular, FIG. 1 is a block diagram depicting an example of a system 100 for identifying customers shopping at a real-world shopping venue 104 as belonging to a group. As shown, certain components of system 100 can be implemented, for example, in the real-world shopping venue 104. In one example, the real-world shopping venue 104 is a retail store and determinations made by server 102 are used to identify visitors 106a-b in the real-world shopping venue 104. Visitors 106a-b use client devices 108a-b while shopping in the real-world shopping venue 104. Visitors 106a-b also interact with products that are attached to product devices 116a-b. In the example of FIG. 1, the product devices 116a-b can be beacons. That is, product devices 116a-b can be devices attached to products within venue 104 that broadcast their locations to nearby portable electronic devices, such as client devices 108a-b. When a visitor 106 is in range of a beacon, the visitor's client device 108 receives the beacon's location and provides the location information to a local server 112 or another collection point in venue 104.

FIG. 1 is a block diagram depicting an example system 100 for identifying visitors to a real-world shopping venue as belonging to the same group. Certain components of system 100 can be implemented, for example, in an open retail environment such as real-world shopping venue 104. System 100 is configured to identify visitors to a real-world shopping venue, such as shoppers in a store, as being members of a group, such as a family or couple. System 100 can be used to identify visitors 106a-b shopping at real-world shopping venue 104 while the visitors 106a-b are carrying or interacting with electronic devices 108a-b. In one example, determinations made by server 102 are used to identify individuals in the real-world shopping venue 104. Visitors 106a-b use client devices 108a-b while shopping in the real-world shopping venue 104. The visitors 106a-b also interact with products that are attached to product devices 116a-b. The physical actions of individuals are tracked by monitoring the locations and uses of client devices 108a-b and product devices 116a-b. For example, local server 112 can receive information from product devices 116a-b through a wireless network when identifying when the product devices 116a and 116b are picked up. The location of the visitors 106a-b can be determined based on client devices 108a and 108b. The physical actions of individuals in a real-world shopping venue can be tracked in additional and alternative ways.

Information about the physical actions of the visitors 106a-b is provided to server 102 through network 115. Server 102 uses the information about the physical actions to make determinations as to whether the visitors 106a-b are members of a group. For example, server 102 may determine to that one individual visitor 106a is member of a family or couple that includes visitor 106b based on previous, simultaneous visits to venue 104 by both visitor 106a and 106b. The determination can also be made based on visitors 106a and 106b remaining in a particular section of the venue 104 together for more than 15 minutes (or any other appropriate time threshold). Such a threshold may be used by server 102 to determine that visitors 106a and 106b are shopping in the same section of a store together.

As another example, server 102 may determine that visitors 106a and 106b belong to the same group based on a database or profile for the group that is populated with data from past visits to venue 104 by visitors 106a and 106b. In this example, server 102 can collect data for visitors 106a-b to venue 104 for various days in order to determine if patterns have been observed in the past for these visitors. For instance, server 102 may identify that visitors 106a and 106b entered venue 104 at approximately the same time and exited venue 104 at approximately the same time. Server 102 can store such entry and exit time data in records of a visitor profile. The records for past visits may indicate that visitors 106a and 106b have visited venue 104 together a certain number of times within a time period (e.g., ten times over the past six months). In this example, the visitor profile indicates that in the last 6 months that there have been 10 occurrences where visitors 106a and 106b visited the venue 104 on the same day. Server 102 can use the visitor profile to determine out of these 10 occurrences, how many times again the entry and exit times for visitors 106a and 106b were the same or within an appropriate time threshold (e.g., within five minutes). Server 102 can use the visitor profile to obtain information indicating that out of the ten occurrences, nine of the occurrences have the same entry and exit times for visitors 106a and 106b. Based on this data, server 102 can identify, with an acceptable confidence level, that visitors 106a and 106b are a part of same group (e.g., in the same family or couple). This is because the visitor profile indicates that out of the last ten times visitor 106a has visited venue 104, nine times this visitor's entry and exit times were approximately the same as the entry and exit times for visitor 106b. This indication provides server 102 with a high confidence that both visitors 106a and 106b are a part of same group. This can be used by server 102 as a first filtering condition for visitor data to determine group membership for visitors.

Once it is determined that visitors 106a and 106b are a part of same group, interactive displays 114a-b can be used to solicit and provide feedback between visitors 106a and 106b. Interactive displays 114a-b can be digital signage devices with their own respective screens in different sections of a store. For example, interactive display 114a can be incorporated into an informational kiosk or a wall-mounted digital signage device at a location in the store. Interactive displays 114a-b are configured to display product images, product summaries, and other dynamic content to visitors 106a-b in the store. Interactive displays 114a-b each have input devices (e.g., cameras 120a-b, touchscreen displays, keyboards, pointing devices, or other input devices) that the visitors 106a-b can use to provide input. The store's webpage or other content pertinent to the store can be displayed on the screens of interactive displays 114a-b. For example, if interactive display 114a is in the store's men's shoe section (see, e.g., men's shoe section 306 in FIG. 3), images of men's shoes available for purchase at the store may be displayed. The interactive displays 114a-b can access respective cameras 120a-b (e.g., webcams) installed near each interactive display 114a and 114b. For instance, a video camera 120a mounted at the top of the screen of interactive display 114a can capture video frames of visitor 106a as he pauses in front of interactive display 114a. Similarly, for example, a webcam 120b that streams images in real time to local server 112 and server 102 via communications network 115 can also capture video frames of visitor 106b as she pauses in front of interactive display 114b.

In one example, the product device 116a is a beacon sticker placed on a product in venue 104 to identify when visitor 106a picks up the product or places the product in a physical shopping cart. Beacon stickers on products have a built in accelerometer. A visitor's client device 108 proximity to such beacons can indicate which product(s) that the visitor 106 is currently near to. For instance, if visitor 106a picks up a product with product device 116a that is a beacon sticker adhered to the product, this can be detected by the accelerometer in the beacon sticker. In another example, a beacon can be a stationary or static beacon placed in a particular section of the venue 104 to identify when the visitor 106a is in that section of the store. Physical actions of visitors 106a-b within venue 104 can be tracked by monitoring the locations and uses of client devices 108a-b and product devices 116a-b. For example, local server 112 can receive information from product devices 116a-b through a wireless network when identifying when the product devices 116a and 116b are picked up. The location of the visitors 106a-b can be determined based on client devices 108a and 108b. The physical actions of visitors to a real-world shopping venue can be tracked in additional and alternative ways.

There are differences between stationary beacons and beacon stickers. Beacons have a bigger battery and were designed for stores such as they can be deployed at the entry/exit gates, various product sections, demonstration areas, etc. A beacon sticker can be attached to an individual product. Beacon stickers can turn things into 'nearables' (e.g., smart products fully detectable by a client device 108). For example, it can be determined if a visitor is coming closer or moving away from the beacon. An app on a client device 108 can measure and visualize the distance between the visitor's position and the beacon to tell if the visitor is coming closer to the beacon, moving away, or if they have stopped, and to create events relevant to the context the person is in.

For example, a beacon broadcasts its ID and the strength of the signal, or Received Signal Strength Indication (RSSI) is being continuously monitored by the client device 108. Based on the signal strength and calibration data, it is possible to infer how far away the client device 108 is from the beacon.

Interferences in signal strength can be eliminated. Because of possible interferences, it is important to sample the signal strength in a way that will filter out sudden spikes and dips, which would influence the read-out. This can be done by using a rolling average, which takes into account multiple read-outs, not just one. This stabilizes distance value, at the expense of slight degradation of responsivity.

Beacons can come with additional sensors. For example, beacons and beacon stickers can both be equipped with accelerometers and temperature sensors, making it possible to measure both motion and the surrounding environment. This means a retailer or store can design mobile apps to react if a nearby beacon is shaken or moved. Additionally, a beacon can track the number of times it was in motion since the last counter reset.

Embodiments are not limited to this example system 100, and it would be apparent to those skilled in the art that other display devices can be used in embodiments described herein as interactive displays and digital signage devices, including, but not limited to, embedded devices, personal computers, mobile devices such as smart phones, laptops, tablet computing devices, or other devices suitable for rendering content on a screen. Many additional devices can be used with system 100, beyond the components and devices illustrated in FIG. 1. For example, interactive displays 114a-b can be any digital signage device implemented using any suitable computing devices for communicating via a LAN and/or WAN 115, and rendering a user interface (UI), and/or executing a browser to render a store's web site.

Information about the physical actions of the visitors 106a-b is provided to server 102 through network 115. Server 102 uses the information about the physical actions to make determinations to facilitate providing assistance to the visitors 106a-b. For example, server 102 may determine to offer individual 106a assistance based on individual 106a remaining in a particular section of a store for more than 20 minutes (or any other appropriate time threshold). As another example, server 102 may determine that visitors 106a and 106b are members of a group based on the visitors' tracked physical actions within real-world shopping venue 104, including physical actions from past visits to the venue.

As shown in FIG. 1, each of product devices 116a-b, interactive displays 114a-b and client devices 108a-b are communicatively coupled to the local server 112. This coupling can be through a local area network (LAN) such as a LAN at a store. The local server 112 is in turn communicatively coupled to server 102 and administrator device 110 via network 115. The network 115 can be a wide area network (WAN). Some interactive displays 114a-b can be implemented as embedded digital signage devices that have integrated input devices or controls thereon not requiring the use of an external input device. For example, interactive displays 114a-b can be embodied as a kiosk with an embedded touchscreen within the kiosk.

Server 102 can include any suitable computing system for hosting and delivering content. For instance, server 102 can host a content management tool. The server 102 can be a backend server that is remote from interactive displays 114a-b at venue 104. In one embodiment, server 102 and local server 112 may be hosted on a single computing system. In other embodiments, server 102 and local server 112 may be hosted on separate servers, or on a virtual server implemented using multiple computing systems or servers connected in a grid or cloud computing topology. As described below with reference to FIG. 10, system 100 can be implemented on a computing system having a single processor in a multi-core/multiprocessor system. Such a system can be configured to operate alone with a single back end server 102, or in a cluster of computing devices operating in a cluster or server farm used to implement system 100.

Electronic content and other data may be exchanged between components of system 100 via a data communications network such as the Internet, a wide area network (WAN) 115, or a local area network (LAN). For instance, in a real-world shopping venue 104 where browsers, interactive displays 114a-b, and cameras 120a-b are installed as components of in-store digital signage devices, a LAN at the venue 104 can be used to exchange data between local server 112 and interactive displays 114a-b. In embodiments, an in-store LAN and/or WAN 115 can be one of or a combination of a wireless or wired network such as WiFi®, Internet, Hybrid Fiber Coax, Data Over Cable Service Interface Specification (DOCSIS), ATM or any other wired or wireless network. A content management tool hosted on server 102 may store and deliver content including, but not limited to, interactive 3D product models, product images, streaming video of product demonstrations, web content for the store's web site, in-store advertisements, and the store's promotional content. Certain types of delivered content can be interactive and can be manipulated by visitors 106a-b at interactive displays 114a-b. For example, a shopper may be able rotate, zoom, and otherwise manipulate a 3D image of a product image that the shopper is viewing on an interactive display 114. By using interactive display 114a, a store visitor 106a whose image is captured by camera 120a will be able to view and interact with content that has been selected and tailored for the visitor 106a based the visitor's identity.

Although only a two interactive displays 114a-b are shown in FIG. 1, it is to be understood that by using system 100, product content can be presented to multiple digital signage devices in the real-world shopping venue 104 such as multiple sections of a store. For example, a first interface including a set of product images tailored for visitor 106a can be displayed on interactive display 114a while another set of product images tailored for visitor 106b can be displayed on interactive display 114b.

Interactive displays 114a-b at different locations in a store can establish respective network connections via a LAN and local server 112 with each other. The interactive displays 114a-b can also establish respective network connections with server 102 via network 115 or another suitable WAN. A browser or content player application can be executed at interactive displays 114a-b to establish network connections via a LAN to access content of a retailer's or store's web site. The network connections can be used to provide targeted content by communicating packetized data representing the content to interactive displays 114a-b based on the locations of the interactive displays 114a-b and identified visitors 106a-b. Embodiments improve the efficiency and operation of system 100 by automatically tailoring content to a particular customer who is viewing an interactive display 114 instead of providing the same content or all of the store's or retailer's electronic content to each interactive display 114 in the store. For example, embodiments reduce the amount of product content sent to interactive displays 114a-b, thus using less computing resources to transmit content via a LAN and network 115, while also requiring fewer resources from interactive displays 114a-b to render the content. That is, tailoring product content based on: the location of an interactive display 114; the identity of a visitor 106 near the interactive display 114; and the group the visitor 106 belongs to avoids the need for system 100 to transmit and present a wider range of product images and product content. Using server 102 and/or local server 112 to automatically select product content and images based on the location of an interactive display 114 within venue 104 and the identity of a visitor 106 near the interactive display 114 also enables system 100 to present relevant product content to the visitor 106 in near real-time while the visitor is still viewing interactive display 114.

Interactive displays 114a-b can be integrated with respective computing devices that host browsers. As illustrated in FIG. 1, interactive displays 114a-b can be communicatively connected to cameras 120a-b, which can read images of visitors 106a-b that are near interactive displays 114a-b. For example, camera 120a can be mounted on the top of interactive display 114a so that camera 120a can capture images of visitor 106a as he shops and pauses in front of interactive display 114a. The system 100 accesses a data backend, such as server 102, in order to obtain content to be presented on interactive display 114a. In one embodiment, electronic content to be presented can be designated or selected by a marketer using a user interface of a content management tool (see, e.g., content management tool 224 of FIG. 2). For example, a content management tool may be used to select product images and other electronic content that is presented on interactive display 114a.

The content management tool (e.g., content management tool 224 of FIG. 2) and server 102 can be located off-site, remote from a store location where interactive displays 114a-b and cameras 120a-b are located. The content management tool 224 can be implemented as part of a content management system providing a marketer user interface (UI), a staging area for campaign content, and publishing of activated campaign assets. Examples of marketer UIs are discussed below with reference to FIGS. 6-8. In one example embodiment, a content management tool such as Adobe® Experience Manager can be used as the content management tool 224. The content management tool 224 can maintain sets of assets for a promotional or marketing campaign to be displayed on in-store screens. In some embodiments, content management tool 224 can be implemented as a content delivery system.

The interactive displays 114a-b with cameras 120a-b can receive data from a content management tool via network 115. The data can include electronic content of a store's or retailer's website such as HTML documents, product images, product videos, et al. to be displayed. The interactive displays 114a-b can be configured to use a browser to display content of the store's web site that can be persisted on a web server such as server 102 or local server 112. The content of the web site can include images read by cameras 120a-b. As shown in FIG. 1, an image read by cameras 120a-b can be transmitted to local server 112 and on to server 102 via network 115. After the read image is received by a content management tool (e.g., a tool hosted on server 102), the image can be transmitted to an image processor for processing. Product images and 3D product models can be presented to a visitor 106.

Figure 2:
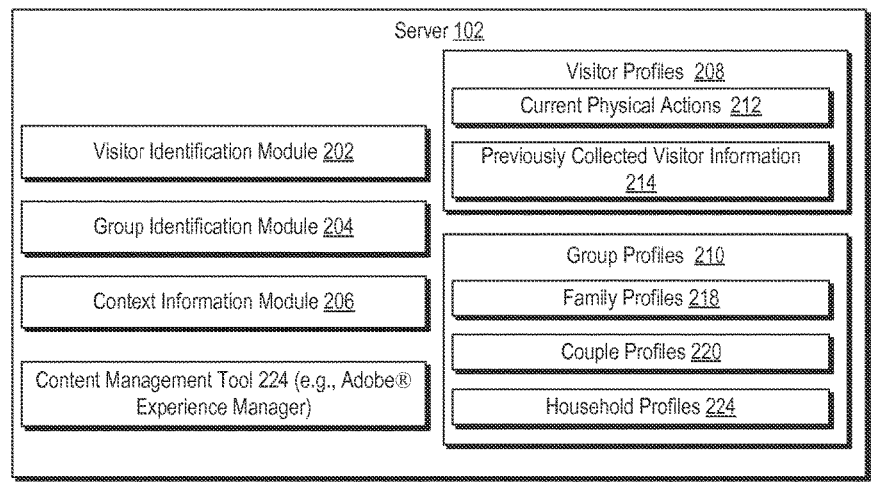
FIG. 2 is a block diagram illustrating exemplary modules for implementing functions in the server of FIG. 1, in accordance with an embodiment of the present invention.

In the example of FIGS. 1 and 2, interactive displays 114a-b can send a video frame image read by cameras 120a-b to a content management tool hosted by server 102 (see, e.g., content management tool 224 of FIG. 2). An image processor on server 102 can process the video frame to determine that the image includes a person who stopped to look at a screen of an interactive display 114 or is within range of a camera 120. For instance, the image processor can detect, based on an image from camera 120, that the image includes a shopper at an in-store display screen of an interactive display 114 (e.g., visitor 106a at interactive display 114a). Once the image processor detects a person, it can pass the image of the person to clothes detector that can detect shapes in the image. The clothes detector can detect shapes of clothing items worn by a visitor 106 in the image using an automatic shape detection technique. Examples of such techniques include assistive clothing pattern recognition and automatic clothing pattern recognition. As would be readily apparent to one of ordinary skill in the art, assistive clothing pattern recognition and automatic clothing pattern recognition can be used to perform shape recognition for clothing item shapes as well as color identification for clothing item shapes. For example, a clothes detector can detect shapes of multiple clothing items (e.g., a shirt, jeans) worn by visitor 106a near interactive display 114a. Such detected clothing item shapes can then be compared to items in the store's catalogue or inventory to determine if they correspond to a particular product offered by the store.

By using an image capture device such as a camera 120b, the interactive display 114b can detect that visitor 106b has paused in front of or is viewing the screen, and then use the camera to capture an image of the visitor. That is, the image of visitor 106b is input obtained via camera 120b. Cameras 120a and 120b can capture images periodically. For instance, respective webcams installed near interactive display 114a-b can capture video frames every second or every five seconds. For example, camera 120a of interactive display 114a can be used to identify visitor 106a, and to identify products that visitor 106a is carrying or holding. When it is determined that a captured image (e.g., a video frame) includes a visitor, an interactive display 114 analyzes this particular frame and determines see if a visitor is in close proximity to the interactive display. If so, the interactive display 114 provides the video frame to local server 112 that can perform steps to identify the visitor. The video frame can also be used to perform clothing pattern recognition so as to identify clothing products or items the visitor is carrying. One example technique is assistive clothing pattern recognition. Assistive clothing pattern recognition can be used to find simple clothing patterns in the video frame. Examples of such clothing patterns include a shirt, shoes, pants or jeans, a blouse, shorts, and a skirt. The clothing pattern recognition detects shapes of clothing items carried or worn by the visitor, and then compares those shapes to pre-defined shapes. For example, regardless of the visitor's gender or size, a shirt worn by the visitor will have a similar shape and can be identified as a shirt based on its shape.

Visitor 106a can interact with an input device of interactive display 114a such as a touchscreen, to place items in a virtual sharing cart. The visitor 106a can then chose to share the sharing cart with visitor 106b who is in a different section of real-world shopping venue 104. Visitor 106b, who can be identified as being near interactive display 114b, can then be provided with product information and images for items in the sharing cart. In one embodiment, visitor 106b is identified using camera 120b of interactive display 114b. In additional or alternative embodiments, visitor 106b is identified based on a determination that client device 108b is near interactive display 114b. For example, GPS data coordinates received from client device 108b periodically at some specific points of time at local server 112 can be used to determine that visitor 106b is near interactive display 114b. In one example, the GPS coordinates can be collected by a retailer's application installed on client device 108b and periodically transmitted to local server 112 for the purposes of identifying visitor 106b and tracking the visitor's movements and actions within venue 104.

In FIG. 1, an administrator 118 of server 102 is remote from the real-world shopping venue 104. Administrator 118 can be located remote from the real-world shopping venue 104 and thus exchange information with local server 112 by communicating through network 115. The administrator 118 can use administrator device 110 to establish and adjust settings for server 102. For example, by interacting with the administrator device 110, the administrator 118 can set thresholds for a number of visits or entry/exit time windows that server 102 uses to determine if visitors are part of a group. In additional or alternative embodiments, the administrator 118 can be located within the real-world shopping venue 104 and thus can be an administrator for local server 112.

FIG. 2 is a block diagram illustrating exemplary modules and tools for implementing visitor identification functions in server 102 of FIG. 1. Similar modules could additionally or alternatively be used in the local server 112 of FIG. 1, local to the real-world shopping venue 104, or on any other appropriate device or devices and at any appropriate location or locations. The server 102 includes modules 202, 204, and 206, as well as content management tool 224, which each are implemented by a processor executing stored computer instructions. As shown in the example of FIG. 2, content management tool 224 can be embodied as an Adobe® Experience Manager system.

The visitor identification module 202 comprises instructions that, when executed by a processor, uses information about a visitor's current physical actions 212 and/or previously collected customer information 214 from visitor profiles 208 to identify visitors to venue 104. The visitors can be identified based on images captured by cameras 120 in venue 104. Identified visitors are analyzed by group identification module 204 to determine if the visitors are members of the same group. This can involve identifying that a visitor has visited venue 104 at the same time as another visitor more than a threshold number of times within a duration, that the visitor's pattern of movement within venue 104 corresponds to another visitor's pattern of movement, that the visitor has picked up at least a threshold number of one type of product also picked up by another visitor, that the customer has picked up a particular product multiple times or for at least a threshold amount of time corresponding to a number of times or amount of time another visitor has picked up the product, etc. The visitor's current physical actions 212 are the physical actions tracked during the visitor's current shopping experience in the real-world shopping venue 104. After the visitor's shopping experience, this information is analyzed and/or added to the visitor's profile 208, for example, being compiled into information stored in the previously collected visitor information 214 of the visitor profiles 208.

The group identification module 204 comprises instructions that, when executed by a processor, use information about a visitor's current physical actions 212, previously collected visitor information 214, and/or group profiles 210, to determine that the visitor is a member of a group. Group identification module 204 can identify a group based on the visitor's prior visits to the venue 104, the visitor's current physical actions in the venue 104, and/or any other criteria or combination of criteria. A visitor's group can additionally or alternatively be identified based on information received from a visitor, e.g., using customer preference information stored in visitor profiles 208 or information received from the visitor during the customer's current shopping experience at the real-world shopping venue 104.

In one specific example, a visitor's current physical actions 212 while in a venue are used in conjunction with previously collected visitor information 214 to conclude that the customer belongs to a group. The current physical actions 212 and previously collected visitor information 214 are compared to data in the group profiles 210 to determine a number of occurrences when the visitor visited the venue with a member of a group over a duration. The number of occurrences in the duration is compared to a threshold to determine if the visitor belongs to a group. For example, if the previously collected visitor information 214 indicates that the visitor has been to the venue 104 fifteen times in the past six months with a member of the group and the visitor's current physical actions 212 indicates that the visitor is currently in the venue with that member, the group identification module 204 can determine that the visitor belongs to the group. In this example, if the visitor has been to the venue 104 fifteen times over the past six months with members of a family in the family profiles 218, the group identification module 204 determines that the visitor is a member of the family. In another example, if the visitor has been to the venue 104 fifteen times over the past six months with a members of a couple in the couple profiles 220, the group identification module 204 determines that the visitor is a member of the couple That is, the group identification module 204 determines that the visitor is a partner or a spouse of another person in the couple profiles 220.

Server 102, in FIG. 2, also includes a context information module 206. Context information module 206 identifies context information for visitors shopping at a real-world shopping venue. The context information module 206 comprises instructions that, when executed by a processor, use information about a visitor's current physical actions 212 and/or previously collected visitor information 214 from visitor profiles 208 to provide useful context information. For example, context information for a visitor can identify, based on the visitor's physical actions 212 while in the real-world shopping venue, that the visitor is interested in men's sportswear and previously collected visitor information 214 can shows that the visitor is a former customer who purchased a Brand A men's apparel item six months ago, purchased a Brand B men's apparel item one year ago, and that the visitor's shopping and browsing history indicates an interest in Brand A, Brand B, and Brand C apparel products. This enables system 100 able to provide tailored product content to the visitor on an interactive display 114 near the visitor based on this context information. The context information enables a store to better sell products and services that the visitor is interested in, as well as cross sell additional products and services.

In an example embodiment, a web site displayed at interactive display 114a can connect to content management tool 224 for content retrieval purposes. For example, an in-store interactive display 114 can connect to the remote server 102 that hosts content management tool 224 in order to obtain content for a store website via network 115. The interactive display 114 retrieves content for a website, which can be shown to store visitor 106a on a large screen (e.g., a connected/smart television, a conventional television, or computer display device, including a liquid crystal display (LCD) or a light emitting diode (LED) display) of the of the interactive display 114a. The content can include product-related electronic content, such as, for example, 3D product models, product documents, product demonstration videos, product images, or any other product-related content relevant to products offered by the store. The content, when displayed on the interactive display 114a, can be specifically adapted for visitor 106a viewing the screen of the interactive display 114a. In some cases, the content includes feedback from visitor 106b regarding items visitor 106a has placed in a sharing cart. In such cases, visitor 106b interacts with nearby interactive display 114b in order to provide feedback on items in the shared cart of visitor 106a. Such feedback can be displayed on a screen of interactive display 114a so that visitor 106a can view the feedback. Interactive displays 114a-b can be embodied, for example, as embedded devices with large, mounted screens. Each of the interactive displays 114a-b can be associated with respective, fixed locations in the real-world shopping venue 104. In certain embodiments, the content management tool 224 can be Adobe® Experience Manager.

In an additional or alternative embodiment, an application (e.g., the store's mobile app) installed on client devices 108a-b carried by visitors 106a-b can provide interaction capabilities similar to those described above with regard to interactive displays 114a-b. In this embodiment, the store's application can be downloaded from server 102 via network 115 or from local server 112 when visitors 106a-b are visiting venue 104. The store's application can provide a user interface on client devices 108a-b that enable visitors 106a-b to solicit and provide feedback to each other while they are in different sections of real-world shopping venue 104, or even when one visitor is in venue 104 and another member of the visitor's group is remote from the venue. For example, visitor 106a can add something to his shared cart through the store's mobile application installed on client device 108a while he is in venue 104. This causes the mobile application to send a push notification to visitor 106b who is a member of visitor 106a's group (e.g., a family member or household member). Visitor 106b, who may be in venue 104 or not, can then interact with the store's mobile app installed on client device 108b in order to provide feedback regarding items that visitor 106a has placed in his sharing cart. Then, this feedback can be displayed on a screen of client device 108a so that visitor 106a can view and consider the feedback while making purchasing decisions in venue 104. In this embodiment, the interface of the store's mobile app installed on client devices 108a-b can be scaled down version of the interface presented on interactive displays 114a-b. As with the interactive displays 114a-b, the mobile app can be used to explore products offered for sale in the real-world shopping venue 104.

Figure 3:
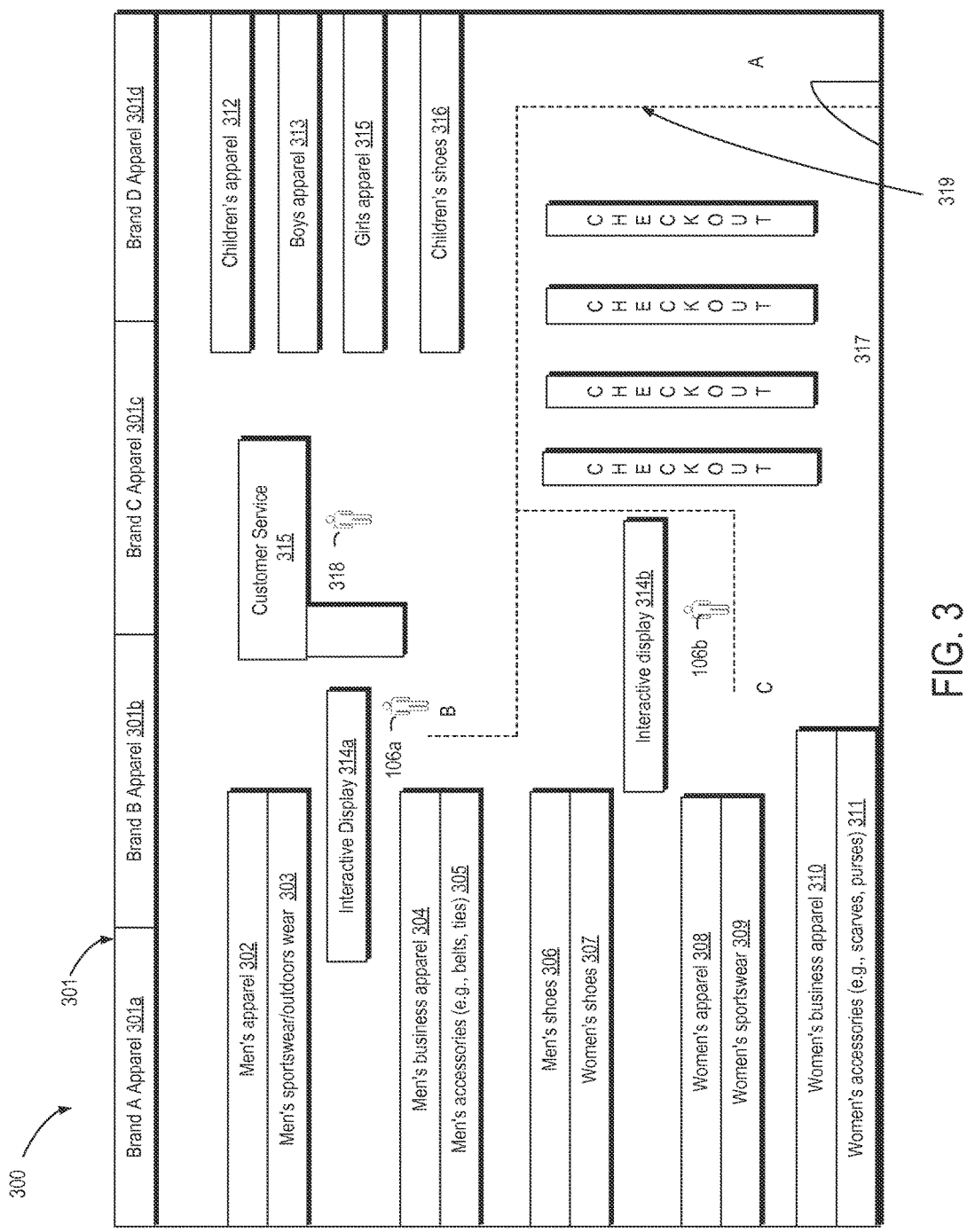
FIG. 3 is a floor plan illustrating example physical actions within a real-world shopping venue used to determine that visitors to the venue belong to a group, in accordance with an embodiment of the present invention.

FIG. 3 is a floor plan 300 illustrating example physical actions within a real-world shopping venue by visitors to the venue that are identified as belonging to a group. In FIG. 3, visitors 106a and 106b can be members of a family or couple who are shopping together in a store. As shown, an embodiment enables visitors 106a and 106b to shop in different sections of their choice in the store, but still ask for and provide feedback to each other via respective interactive displays 314a and 314b. In one example, interactive displays 314a and 314b are Adobe® Experience Manager screens usable by visitors 106a and 106b to solicit and provide feedback regarding items in a sharing cart. The items can correlate to products offered for sale at different locations of the floor plan 300 within the store. The floor plan 300 includes shelves and displays that offer various types of products: brand-specific apparel 301a-d, men's apparel 302, men's sportswear 303, men's business apparel 304, men's accessories 305, men's shoes 306, women's shoes 307, women's apparel 308, women's sportswear 309, women's business apparel 310, women's accessories 311, children's apparel 312, boy's apparel 313, girl's apparel 314, and children's shoes 316.

A customer service support person 318 stands behind a customer service counter 315 and is available to help visitor 106a. In this example, the visitors 106a-b move in the pattern represented by dashed line 319 after entering the store. In combination with visitor profiles 208 that include previously collected visitor information 214, characteristics of the pattern 319 are used to identify visitors 106a-b and to determine that they are members of a group shopping together. Specifically, in this example, visitors 106a and 106b enter the store together at location A near the checkout aisles 317. In one example, the entry of visitors 106a-b into the store can be detected by static or stationary beacons that are near the door or checkout aisles 317. In another example, the visitors 106a-b can be detected based on images captured at the store, e.g., using images from an in-store video camera, to determine the identity of visitors facing the camera. Such a determination can be made by comparing the captured images with stored images included in the previously collected visitor information 214.

In the example of FIG. 3, after the visitors 106a-b are identified, group profiles 210 are used in conjunction with current physical actions 212 in the store that are tracked in floor plan 300 to determine if the visitors 106a-b are members of the same group. For example, based on the visitors 106a-b entering the store together at location A, and the identification of these visitors 106a-b, they can be compared to identities in couple profiles 220 to determine that the visitors are a couple (e.g., spouses or partners).

After it is determined that the visitors 106a-b are members of the same group, the tracked physical actions of each visitor in the store can be used to enhance their shopping experience. For example, based on visitor 106a spending more than a threshold amount of time in a particular location (e.g., 3 minutes at location B), the system determines to present content to visitor 106a at interactive display 314a near the men's sportswear section 303. Similarly, based on visitor 106b spending more than the threshold amount of time in another location (e.g., location C), the system determines to present content to visitor 106b at interactive display 314b near the women's apparel section 308. The content presented to each visitor can be tailored to the visitors' respective locations (e.g., in the men's sportswear section 303 vs. the women's apparel section 308). The content can be displayed in a user interface provided by a content management tool such as, for example, Adobe® Experience Manager. The content can also be based at least in part on feedback provided by one visitor to another. For example, the content presented to visitor 106a on interactive display 314a can include feedback from visitor 106b provided via interactive display 314b, where the feedback relates to items that visitor 106a placed in his sharing cart. Also, for example, the content can be based on the respective identities of each visitor. For instance, content presented to visitor 106a on interactive display 314a can be tailored based on identifying visitor 106a as the male partner of visitor 106b. Additional or alternative criteria can be used to determine which content to present to the visitors 106a-b at interactive displays 314a-b.

The locations of visitors 106a-b as they move within floor plan 300 may be determined by one or more beacons, e.g., devices positioned in a fixed location within the store that broadcast their locations to nearby portable electronic devices. When a visitor 106 is in range of a beacon, the customer's electronic device (e.g., client device 108) receives the beacon's location and provides the location information to a server or other collection point. In one example, a beacon is placed in a particular section of the store to identify when the customer is in that section of the store. In another example, beacon stickers are placed on products (see, e.g., product devices 116a-b in FIG. 1).

The store with floor plan 300 can have an IoT-enabled environment that includes static beacons, beacon stickers, mobile beacons, and radio frequency identification (RFID) tag readers. Static beacons can be located in various sections such as at entry/exit gates (e.g., location A in FIG. 3), points of sale/cash registers (e.g., checkout aisles 317), display counters, interactive displays (e.g., locations B and C in FIG. 3), product sections (e.g., sections 301-316), demonstration kiosks, at customer service counter 315, etc. The proximity of a visitor's smart device (e.g., client device 108a or 108b) to a static beacon can be used to identify the section within floor plan 300 in which the visitor 106 is currently present.

Beacon stickers with built in accelerometers can be placed on products in the store. A visitor's smart device proximity to such beacon stickers can indicate which product(s) the visitor 106 is currently near. If the visitor 106 picks up a product with a beacon sticker adhered to it, this can be detected by the accelerometer in the beacon sticker. For example, a beacon sticker with an accelerometer can be affixed to a sample product and used to determine both how long the visitor is in the section of the store and that the visitor picked up the sample product.

Physical shopping carts and in-store screens (e.g., interactive displays 314a-b) used by visitors 106a-b can be fitted with mobile beacons and RFID tag readers. Like beacon stickers, the mobile beacons have accelerometers and can be used to determine a visitor's smart device proximity to the mobile beacons. The mobile beacons mounted to physical shopping carts can indicate which cart a particular visitor 106 is currently using. In another embodiment, RFID tags or near field communication (NFC) devices are used to determine the locations of visitors 106a-b. A visitor can carry an electronic device with an RFID tag or an RFID reader that interacts with RFID tags and/or RFID readers in the store to determine the visitor's location.

With continued reference to the example system 100 of FIG. 1 and the example floor plan 300 of FIG. 3, the example couple comprising visitors 106a-b shopping in the store can each have their own client device 108 (e.g., a mobile computing device such as a smartphone). Each client device 108 can have at least one of a retailer's app installed or a third party publisher app (e.g., an app from a content provider such as a "Wall Street Journal" or "ESPN" app). In the example with a third party app, beacons in the store may be provided by a company that has partnership with the retailer. For example, the retailer can install beacons in various sections of the store (e.g., in one or more of locations A-C and sections 301-316). The third party (e.g., a beacon network company) can provide store analytics data and help the retailer send push notifications to in-store visitors. In this case, the visitor need not have the retailer's app installed on their smart device. The beacon network company can have ties to a few major publishers. If the visitor has an app of any of these publishers on his smart device, store visit data can be collected and personalized. In this way, push notifications can be sent to visitors via a publisher's app helping the publisher to earn some revenue An embodiment can identify if a group of visitors who routinely visit a retail store are a part of the same family based on their in-store activities. Such in-store activities can be detected by static beacons, beacon stickers on products, mobile beacons mounted to physical shopping carts used by the visitors, and cameras or other input devices associated with interactive displays 314a-b.

Figure 4:
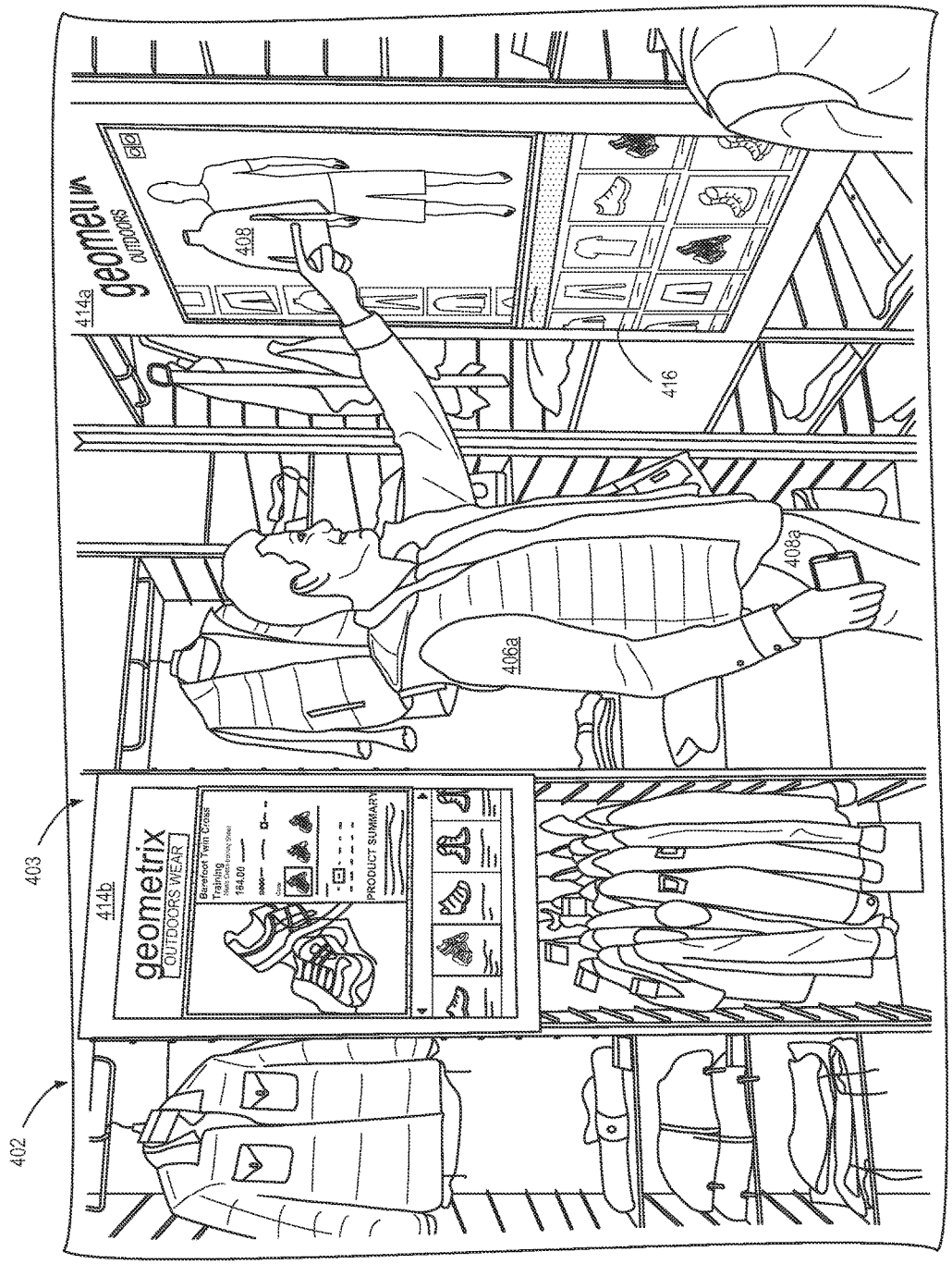
FIG. 4 is depicts an example interactive interface presented to a visitor to a real-world shopping venue, in accordance with an embodiment of the present invention.

FIG. 4 depicts an example interactive interface presented to a visitor to a real-world shopping venue. In particular, FIG. 4 depicts an interface that is presented on interactive display 414a to visitor 106a while the visitor is in the men's outdoors wear section 403 within a men's apparel section 402 of a store. In the example of FIG. 4, the visitor 106 is able to interact with a touchscreen interface of interactive display 414a in order to select products 408 and items of interest that are offered by the store. As shown, the visitor 106a may be presented with product images 416. The product images 416 can be selected by content management tool 224. In certain embodiments, the product images 416 are based at least in part on the identity of visitor 106a, previously collected visitor information 214, and/or the visitor's membership in a group such as a family, couple, or household.

Interactive displays 414a-b can be communicatively connected to a camera via a local network (e.g., a local area network/LAN) in a store and communicatively connected to a content management system via another suitable network (e.g., network 115 of FIG. 1 or any other wide area network/WAN, such as the Internet). Generally, the interactive displays 414a-b can be any type of device, such as a personal computer (PC), tablet, or smart phone, configured to access and present content (e.g., a web page, product images, 3D product models, product summaries and descriptions, product documents and manuals, etc.) provided by a content-providing server of a content management tool. The digital signage device can include a screen for displaying, among other things, content rendered by a browser. The screen can also be used to display any other type of human-readable content. The screen can include any electronic visual display device (e.g., a conventional television or computer monitor, including a liquid crystal display (LCD) or a light emitting diode (LED) display). In some cases, the screen can be a large screen physically integrated into the digital signage device (e.g., such as found in an information kiosk or a wall-mounted device). In other cases, the digital signage device can be a mobile device having an integrated screen (e.g., such as a tethered mobile tablet device in a store). As would be readily apparent to one of ordinary skill in the art, such a mobile device can include input devices such as buttons and an integrated camera. The camera can be any device configured to detect light and form an image, such as a video camera or a webcam, for example. The screen can include any electronic visual display device (e.g., a conventional television or computer monitor, including a liquid crystal display (LCD) or a light emitting diode (LED) display).

As shown in FIG. 4, the visitor 106a is also carrying a client device 108a. By way of example, the client device 108a can be a smart phone, a tablet device (e.g., iPad® from Apple Inc., a device running an Android operating system, Microsoft Surface device, etc.), or other suitable mobile computing device. That is, the client device 108a can be a mobile computing device operating one of a variety of mobile operating systems and platforms, such as the iOS operating system (OS) developed by Apple Inc., the Android platform from Google Inc., a Microsoft Windows® OS, and similar operating systems providing wireless communications, content display, and image capture capabilities. The client device 108a can have a store's mobile app installed thereon so that the visitor 106a can access scaled down interfaces on the client device 108a that are similar to the interfaces shown on interactive displays 414a-b.

By way of further example, the interactive displays 414a-b can include personal computers or other suitable computing devices, such as a desktop device. As will be appreciated in view of this disclosure, the interactive displays 414a-b can be any suitable digital signage device and do not necessarily need to stationary by design. For example, if the interactive displays 414a-b are mobile, their screens may be physically integrated into a mobile device, instead of being dedicated, separate displays mounted at locations in a store, as shown in the non-limiting example of FIG. 4. Alternatively, as shown in the examples of FIGS. 1 and 4, the interactive displays 114a-b and 414a-b can be devices where the screens and cameras 120a-b are physically integrated into the interactive displays 114a-b and 414a-b. It will be understood that the functions of the computing devices variously described in this disclosure can be performed on and by any number of computing devices, depending on the particular application of the system. For instance, one or more interactive displays 414a-b can each include respective browsers, screens, and cameras. The interactive displays 414a-b can each include their own web browser or another application suitable for retrieving, processing, displaying and interacting with content provisioned by a content management tool, a store's website server, or any combination of these or other servers. Data representing the retailer's or store's content can be stored in a content repository accessible by the interactive displays 414a-b. Such a content repository can be implemented using one or more databases or other storage devices accessible by the interactive displays 414a-b.

Content stored in the content repository can be uniquely identified by an address, metadata, filename, version identifier, or other identifying information. Non-limiting examples of such identifying information include a version number, a serial number, a document file name/location (e.g., a URL), a numeric value, an access code, a text string, instructions that can be executed by a processor (e.g., 'retrieve content x from database y'), or any other data usable to identify and retrieve content such as product images, textual product information, product videos, and 3D product models.

Example Methods

Figure 5:
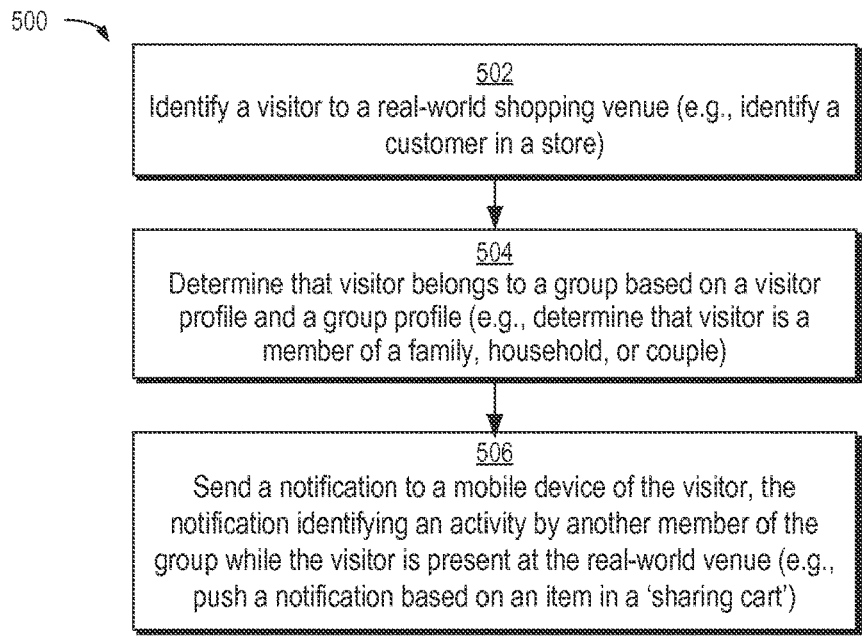
FIG. 5 is a flowchart illustrating an example method for identifying visitors to a real-world shopping venue as being members of a group, in accordance with an embodiment of the present invention.

FIG. 5 is a flow chart of an exemplary method 500 for identifying visitors to a real-world shopping venue (e.g., customers shopping at a store) and determining whether the identified visitors belong to a group, where the visitors are carrying mobile devices connected to a communication network. Method 500 can be used to identify visitors to a real-world shopping venue and determine that the identified visitors belong to a group, in accordance with embodiments. The example method 500 may, for example, be implemented by components of system 100 of FIG. 1. In particular, the example method 500 may be implemented by the server 102, local server 112, client devices 108a-b, and interactive displays 114a-b of FIG. 1. The exemplary method 500 is performed by a processor of a computing device executing instructions to perform one or more of the following operations.

Method 500 involves identifying a visitor to the real-world shopping venue (e.g., identifying a customer in a store) as shown in block 502, and then determining that the identified visitor belongs to a group based on a visitor profile and a group profile, as shown in block 504.

In the example of FIG. 5, block 504 can comprise determining that the visitor is a member of a family, a household, or a couple. Determining that the visitor is a member of a group, in one embodiment, involves determining that the visitor visited the real-world shopping venue more than a threshold number of times together with another member of the group. Example steps for performing the determining of block 504 are described in the following paragraphs. An embodiment can identify if a set of visitors who routinely visit venue 104 are a part of the same group (e.g., the same family) based on data from their past and present in-store activities. Block 504 can determine if a set of visitors who routinely visit a store are a part of the same cohesive group by performing the following steps:

A first filtering condition can be determined by using previously collected visitor information 214 to determine if members of the group (e.g., members of a family, couple, or household) have previously entered and exited the store at almost the same time. Then, for visitors satisfying the first filter condition, a second filtering condition can be based on collected GPS coordinates of the visitors. For example, families, couples, housemates, and roommates generally live together. Hence, GPS data coordinates received periodically at some specific points of time (e.g., nighttime, weekends, etc.) would be the same many times. In certain embodiments, the GPS coordinates can be received by a retailer's, a third party publisher's application, or at server 102. In some cases, GPS data alone may not be sufficient as for multistoried or multiunit residential building. For example, multiple families, couples, or households may have the same GPS coordinates. In such cases, an altimeter or other sensor of client devices 108 can be used to filter visitors and identify them as being members of a cohesive group.

Block 504 can also use in-store activities as a third filtering condition to determine that visitors belong to a cohesive group. For example, group members may occasionally use the same physical shopping cart while shopping in a retailer's store. Even if the visitors use different shopping carts, they may occasionally pay for items in the store using the same payment means (e.g., a physical credit or debit card, or a mobile payment system such as MasterCard Contactless®, Google Wallet, Visa PayWave®, American Express® ExpressPay or Apple Pay). That is even when the visitors are using different physical shopping carts, if they are members of the same group, they may use the same payment means to pay for items in their carts. Hence, an embodiment can use a common payment means as fourth filtering condition for determining that visitors belong to the same group.

Based on the above four filtering conditions, block 504 can comprise calculating or assigning a confidence level for correctly determining if the set of visitors belong to the same cohesive group (e.g., are part of the same family, couple, or household). Block 504 can assign an ultra-high confidence level when all of the four filtering conditions described above are satisfied. Block 504 can assign a super high confidence level when the first two filtering conditions are satisfied, and either of the third or fourth filtering conditions is satisfied. Block 504 can also comprise assigning a high confidence level when the first two filtering conditions are satisfied.

The following paragraphs describe example steps for performing block 504. In step (1), as various visitors enter/exit a real-world shopping venue such as a store, such access or egress is detected by beacons placed at an entry/exit section (see, e.g., location A in FIG. 3) and the corresponding entry/exit times are stored at a marketer's server in a table 'T.' The marketer can be a retailer or operator of a real-world shopping venue such as a retail store. In one embodiment, the marketer's server is server 102 shown in FIG. 1 and table T is used to store visitor profiles 208, which includes previously collected visitor information 214. Over time, table T will have the entry/exit time data of all the visitors who have visited the store in the past.

Next, in step (2) a set of groups is initialized to NULL. The set of groups may be stored within group profiles 210. In the example provided in the following steps, the set of groups is a set of families 'F.' The set of families F may be stored as family profiles 218 within group profiles 210.

Then, in step (3), an embodiment checks the first filtering condition described above. This filtering condition is based on the entry/exit time data for visitors to a store. This step identifies a set of visitors that has almost the same entry/exit time for most of their previous visits to the store, wherein all the visitors in the set visited the store on the same day. The following is an example of how step (3) can be performed:

a. At the end of every day, determine the visitors whose both the entry and exit time was almost the same and form a set of clusters 'C' based on this determination.

b. For every cluster element 'C_i' in cluster 'C'
      i. Generate all combinations of visitors in cluster 'C_i' and store in the set 'C_C_i'
      ii. For every combination 'C_C_i_j' in 'C_C_i':
        1. Determine if for their last 'N' visits to the store where all of the visitors in the combination 'C_C_i_j' visited the store on the same day, entry and exit time of all the visitors was almost the same for more than a threshold 'T1' percentage of times. In an embodiment, the threshold 'T1' can be specified by the marketer. In one embodiment, a default threshold T1 of 90% can be used.

If yes, add the combination 'C_C_i_j' to the set of families 'F' with a MEDIUM confidence level.

Next, in step (4), an embodiment leverages the data from step (3) checks the second filtering condition based on GPS data. That is, step (4) uses received GPS coordinates to infer that the visitors in the combination 'C_C_i_j' are in the family or live together as a household or couple. This is done for the combination 'C_C_i_j' that has already identified as a potential family with MEDIUM confidence. The following is an example of how step (4) can be performed:

a. For every family 'F_i' in 'F' with MEDIUM confidence
      i. Sample GPS data of the various members 'M_F_i' of the family 'F_i'
      ii. If out of 'N' samples, more than a threshold 'T2' percentage of samples corresponds to almost the same GPS data, increase the confidence of family 'F_i' from MEDIUM to HIGH. In an embodiment, threshold T2 can be specified by the marketer. In one embodiment, a default threshold T2 of 20% can be used.

Next, in step (5), an embodiment leverages the data from the previous steps and checks the third filtering condition based on if a physical shopping cart is occasionally shared by the various, potential members of the family. Step (5) can also determine if the potential family members are moving together with the shared cart. The following is an example of how step (5) can be performed:

a. For every family 'F_j' in 'F' with HIGH confidence
      i. The next time the family 'F_j' comes in the store and any member 'M_F_j' of the family, 'F_j' picks up a physical shopping cart 'K' with a beacon 'B_K' attached to it and starts moving with it. Continued proximity of beacon 'B_K' with the visitor 'M_F_j' will indicate that visitor 'M_F_j' is moving the cart.
      ii. If there is an instance where other members of the family 'F_j' are also in the continued proximity of the beacon 'B_K' attached to the cart 'K' for more than a threshold 'T3' duration of time (suggesting that the members of the family are moving together with the cart), increase the confidence of the family 'F_j' from HIGH to SUPER HIGH.

At this point, step (6) can be performed to do a final round of filtering based on determining that the same payment means (e.g., same credit card) is used for paying for the items of the various family members. The following is an example of how step (6) can be performed:

a. For every family 'F_k' in 'F' with HIGH or SUPER HIGH confidence
  i. The next time the family 'F_k' comes in the store
    1. Using the beacons attached to the carts and the continued proximity of visitors with the beacons attached to their corresponding carts, identify the carts corresponding to every member.
    2. If the same payment means (e.g., same credit card) is used for paying the items in all the carts corresponding to the various family members, increase the confidence to ULTRA HIGH.

Method 500 also involves sending a notification to a mobile device of the identified visitor, where the notification identifies an activity by another member of the group while the visitor is present at the real-world venue, as shown in block 506. The notification, in one embodiment, can be feedback from the group member that indicates that member's opinion regarding products or items in the visitor's virtual sharing cart. Block 506 can include tracking the visitor's physical location or section within the real-world shopping venue. For example, as discussed with reference to FIG. 3 above, the floor plan of a real-world shopping venue may be segmented into sections, which may have respective interactive displays located within them. In one embodiment, sections correspond to particular product types and/or brands (see, e.g., sections 301a-d of FIG. 3). The visitor's location can be tracked relative to these sections. For example, the customer's location can be tracked to identify that the customer has moved into a sportswear section of the real-world shopping venue in order to provide the visitor with a family member's feedback regarding a sportswear item that the visitor has placed in his sharing cart while the visitor is in the sportswear section.

Block 506 can provide a family-friendly in-store experience that is facilitated by in-store screens (e.g., interactive displays 114a-b). For example, by using the group/family identification steps described above with reference to block 504, a retailer has already identified that a set of visitors/users U1, U2, . . . UN forms a family or couple. In the case of a couple, N will be two. In order to providing this in-store experience, block 506 can comprise performing the following steps:

Step (1) begins when it is determined that a visitor, e.g., U1, is near a digital signage device (e.g., an in-store screen) that is placed in a given section of the store (e.g., interactive display 314a in the men's sportswear section 303). In step (1), it is also determined that U1 is exploring some product on the interactive display 114a. This is identified by the proximity of U1's mobile client device 108 from the beacon attached on the interactive display 114a.

Next, in step (2), the family data that the retailer has is used to identify the family members of the user U1. For example, the retailer can access stored family profiles 218 to identify the family members of the visitor/user U1. In step (2), the retailer locates the family members in the store. For example, the retailer can use local server 112 to locate family members within sections of the store. The locations in which the family members are present can be determined using data from static beacons placed in the sections. In this way, step (2) determines if some of the family members are currently present in the store. Step (2) can include querying for data from the current physical actions 212 stored in the visitor profiles 208.

In an embodiment, a marketer can specify whether to offer this functionality to families that are identified with High, Super High, or Ultra High confidence levels.

Then, in step (3), if any of the family members are present in the store but are not in the section where U1 is browsing the product, an 'Add to Sharing Cart' option can be presented to the visitor/user U1. This Add to Sharing Cart option can be presented, for example on an interface of an interactive display 114 nearby to U1 or on an interface of U1's client device 108. At this point, visitor/user U1 can click on an Add to Sharing Cart button if he would like to receive feedback from any of his family members. Selecting or clicking the Add to Sharing Cart button will also add the item being browsed to the Sharing Cart.

Next, step (4) detects items that the visitor/user U1 is holding in his hand. This determination is performed by using beacon stickers with accelerometers that are attached to the items The visitor's app on his client device 108 can continuously receive an immediate signal with movement from the corresponding beacon stickers and also from the in-store screen when he is near to the screen. The detected items can also be shown on the in-store screen and the visitor/user U1 can choose to add any of the items to the Sharing Cart.

Then, in step (5), once the visitor/user U1 is done with adding items to be shared, he can share the 'shared cart' with his family members. This sharing can be carried out as follows:

a. Names of the various family members from (U2 . . . UN) that are present in the store will be shown to visitor/user U1 and he can choose to select any of them with which the items are to be shared.

b. Further, in the shared cart, visitor/user U1 can drag drop the items so as to specify his preference order. An example of this interface is provided in FIG. 9.

In step (6), once the visitor/user U1 shares the items, push notifications can be sent to the corresponding family members with whom the list of items is shared to provide feedback.

Next, in step (7), as any of these family members (say, for example, U2) go to a nearby in-store screen, the following can be performed. The nearby in-store screen can be detected by a beacon mounted or attached near the screen (e.g., mounted to a nearby interactive display 114b).

a. The list of items shared will be presented to the family member U2 b. U2 can explore these items in a rich manner at a digital signage device (e.g., interactive display 114b) helps users explore items in highly engaging and rich (fidelity) manner and provide her feedback via comments or reorder items using drag drop mechanism.

c. Once U2 submits her feedback, U1 can see this feedback right on a digital signage device (e.g., interactive display 114a) on which he's exploring items. If U1 has moved away from interactive display 114b, a push notification would be sent to him containing the feedback so that such feedback can be viewed within a mobile app on U1's client device 108.

In step (8), if user U1 has not shared any item using the 'Add to Shared Cart' mechanism, but has directly added the item to the physical shopping cart (which suggests that he did not want to receive any feedback on the item and wants to purchase it), a push notification can be sent to the family members using the data for the corresponding matching item for that family member as specified by the marketer or retailer. The following is an example of how this can be done:

a. For every product, a marketer can specify some matching products and the corresponding family members (e.g., wife/male child/female child, etc.) that may be interested in that product.

b. Visitor/user U1 has added an item to the physical shopping cart would be determined by the continued proximity of the user's device receiving an immediate signal from a beacon sticker attached to the product even when the visitor/user U1 has moved out of the section where the product was located. Another way to achieve the above point is as follows: A physical shopping cart fitted with an RFID reader can also detect items placed in it by reading their RFID tags and continuous proximity of beacon attached to the cart with a visitor/user U1 detects that U1 has added these items to the physical shopping cart.

c. Once visitor/user U1 has added an item to the physical shopping cart, using the information provided by the marketer (corresponding matching item) and the fact that the corresponding family member (say U2) is currently present in the store:

i. A push notification can be sent to that family member U2 informing the member of the item and the corresponding item that has been added to the cart by the other family member U1.

ii. When the family member U2 reaches a nearby in-store screen (e.g., interactive display 114b), detailed information about the matching item along with the item added to the physical cart by U1) can be shown on the interactive display 114b which U2 can interact with in order to explore the information.

Block 506 can include sending a push notification to family members with whom a visitor to a real-world shopping venue has shared product(s). For example, method 500 can be performed to display product information of the products that are shared with the other family member(s) when they reach a nearby in-store screen within the real-world shopping venue. After receiving the push notification sent in block 506, other family member(s) can provide their feedback right on an in-store screen. This can be done by changing the order of the products or providing text comments for any product(s). In this way, method 600 can enable the visitor to the real-world shopping venue to receive the feedback of other family members on an in-store screen within a real-world shopping venue when the visitor is near the screen. Otherwise, block 506 can further comprise sending a push notification to the visitor regarding the feedback.

In an embodiment, block 506 includes sending a push notification to other family members with corresponding matching items as specified by the marketer, when a visitor to a real-world shopping venue adds an item to his physical cart. By interacting with a sharing cart interface, the visitor can drag and drop the items to indicate his preference with the members with whom sharing will be done, and a push notification of this preference will be sent to the members.

Figure 6:
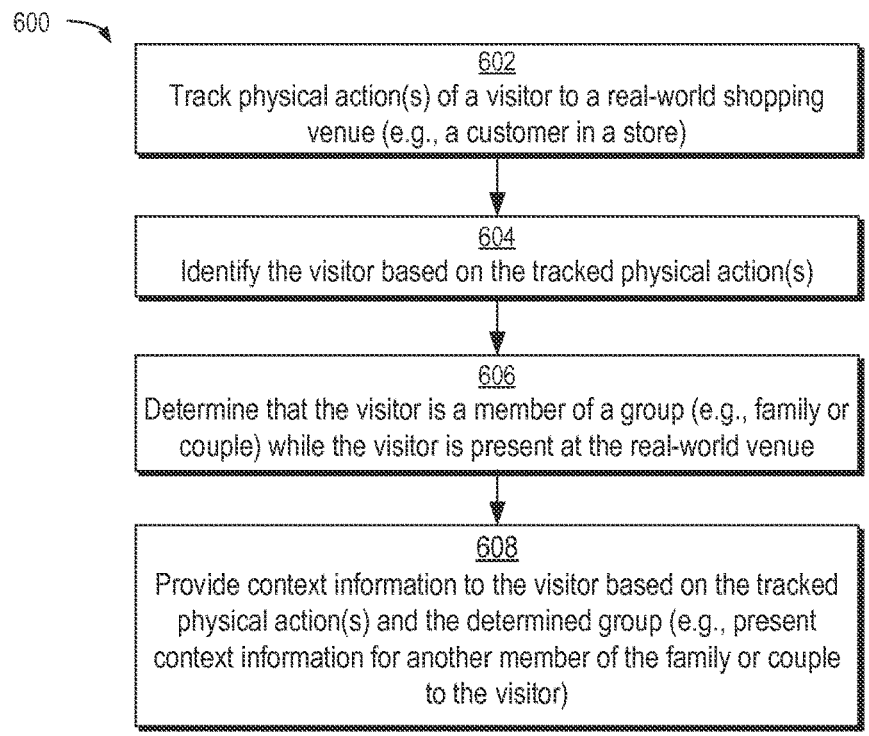
FIG. 6 is a flowchart illustrating an example method for identifying customers shopping at a real-world shopping venue carrying mobile devices connected to a communication network, in accordance with an embodiment of the present invention.

FIG. 6 is a flowchart illustrating an example method 600 for tracking physical actions of a visitor shopping at a real-world shopping venue carrying a mobile device connected to a communication network, using the tracked actions to identify the visitor and to determine that the visitor is a member of a group, and to provide context information to the visitor. Method 600 can be used to identify a visitor to a real-world shopping venue, determine that the identified visitor is a member of a group, and then provide context information to the visitor, in accordance with embodiments. The example method 600 may, for example, be implemented by components of system 100 of FIG. 1. In particular, the example method 600 may be implemented by the server 102, local server 112, client devices 108a-b, and interactive displays 114a-b of FIG. 1. The exemplary method 600 is performed by a processor of a computing device executing instructions to perform one or more of the following operations.

Method 600 involves tracking physical actions of a visitor present at the real-world shopping venue, as shown in block 602. Tracking the physical actions, in one embodiment, involves determining that the visitor spent more than a threshold amount of time at a particular location or section within the real-world shopping venue. For example, the floor plan of a real-world shopping venue may be segmented into sections as shown in FIG. 3, which may have similar or differing sizes. In one embodiment, sections are selected to correspond to particular product types and/or brands. The visitor's location can be tracked relative to these sections. For example, the visitor's location can be tracked to identify that the visitor is moving out of a particular section of the real-world shopping venue to present product information while he is still in the section.

Method 600 further involves identify the visitor based on the tracked physical actions, as shown in block 604. The context information about the tracked physical actions from block 602 can be used to identify the visitor in block 604. For example, the context information can identify prior interactions between the visitor and an interactive display 114 in a particular section of the store and other in-store actions. The tracked physical actions can be stored as current physical actions 212 in visitor profiles 208. In block 604, these current physical actions 212 can be used in conjunction with previously collected visitor information 214 of the visitor profiles 208 to identify the visitor.

Method 600 further involves determining that the visitor is a member of a group (e.g., a family, a couple, or a household) while the visitor is present at the real-world venue, as shown in block 606. This determination can involve similar steps as performed in block 504 of FIG. 5. For example, the determination of block 606 can involve identifying that a set of visitors are a part of the same family based at least in part on their entry/exit times for previous visits, GPS data, cart sharing during previous visits, and payment means for bills from the previous visits.

Method 600 also involves providing context information to the visitor based on the tracked physical action(s) and the determined group, as shown in block 608. As shown, block 608 can comprise presenting context information for another member of the family or couple to the visitor. Block 608 can include providing context information to the visitor based on the tracked physical actions from block 602. The context information can include the section where the visitor is present or identify the product or type of product in which the visitor is interested. In one embodiment, the context information identifies products that the visitor interacted with while in the real-world shopping venue.

In another embodiment, the context information identifies a section of the real-world shopping venue where the visitor is present. In another embodiment, the context information identifies a related section of the real-world shopping venue that the visitor previously visited. For example, where a visitor visited the men's sportswear section for some time before coming to the men's shoe section, an interactive display near the men's shoe section can display suggested combinations of sportswear items with corresponding shoes.

The context information can include information about competitor brands that the visitor has visited. For example, if a visitor has visited Brand A apparel section for a few minutes, and then moves to the Brand B apparel section, an interactive display near the Brand B apparel section can present suggested combinations of Brand A and B apparel items. In this way, the context information can also include cross-selling information.

The context information can also include information about features of the product or category of interest to the visitor. Such interest, in one example, is determined based on additional tracking technologies. For example, eye tracking technology can be used by a camera 120 of an interactive display 114 to determine that the visitor prioritizes certain characteristics and features of a product displayed on the interactive display 114.

The context information can also identify if a physical shopping cart is occasionally shared by the group members (e.g., the visitor's family members). The context information can also identify if billing for all the physical shopping carts of the various members of the family is done by the same credit card/payment mechanism. The context information can be used to provide a sharing (feedback) mechanism for the visitor as the visitor browses the products on an in-store screen, wherein the products can be shared with the visitor's family members who are present in the store but are in different section.

The context information can further be used to automatically identify the products that the visitor to a real-world shopping venue is carrying in his hand/cart and allow him to share them with his family members who are present in the store but are in different section of the store.

By carrying out blocks 602-608, the method 600 can automatically identify families from a set of visitors that are visiting a real-world shopping venue such as a store. The method 600 can automatically identify visitors that are a part of the same family.

Embodiments disclosed herein provide numerous advantages. Certain embodiments can be implemented using a content management tool such as Adobe® Experience Manager. By using the interface of such a content management tool, these embodiments present ways to make a shopping experience highly engaging for families and couples who are shopping together in a store. The impact of making shopping experience family-friendly/couple-friendly on retailers bottom-line can result in higher sales for the store.

Embodiments take advantage of research showing that families and couple shop together many times. For instance, embodiments ensure a seamless communication and feedback mechanism between members of families while they shop in their respective sections in a store, hence making the shopping experience fundamentally more engaging for them.

By using the example techniques, when a person visits a retailer's store multiple times with a spouse or partner, if after few visits, when both of the person and spouse/partner are in store but in different sections, embodiments enable a retailer to let the couple share items that one member of the couple shortlisted with their partner and ask for instant feedback. This can be useful, for example, in situations where a couple knows: that they can shop in their respective sections and still share what they like with their partner for instant feedback; and that the other partner can also explore these shortlisted items in full fidelity on an in-store screen so as to enable that other partner to provide feedback. In this way, the couple can efficiently spend their time in the store and make purchases they know their partner has reviewed and approved.

Embodiments cover one or more of the following use cases: asking for feedback on items that a family member explored on an in-store screen; asking for feedback on items that are in the family member's hands; and showing relevant items to another family member based on items that are in the cart of first family member.

Example User Interfaces

Figure 7:
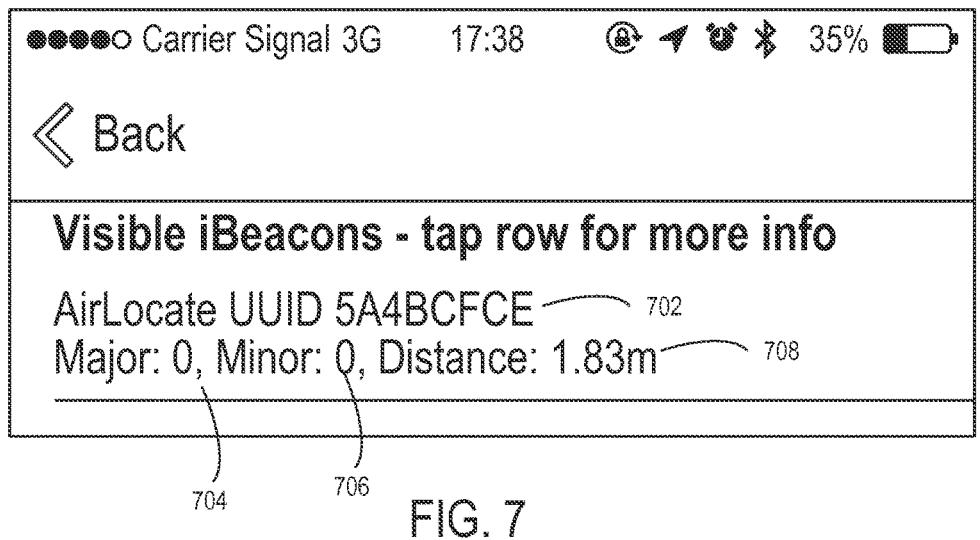
FIGS. 7 and 8 depict application interfaces for locating beacons in a real-world shopping venue, in accordance with various embodiments.
Figure 8:
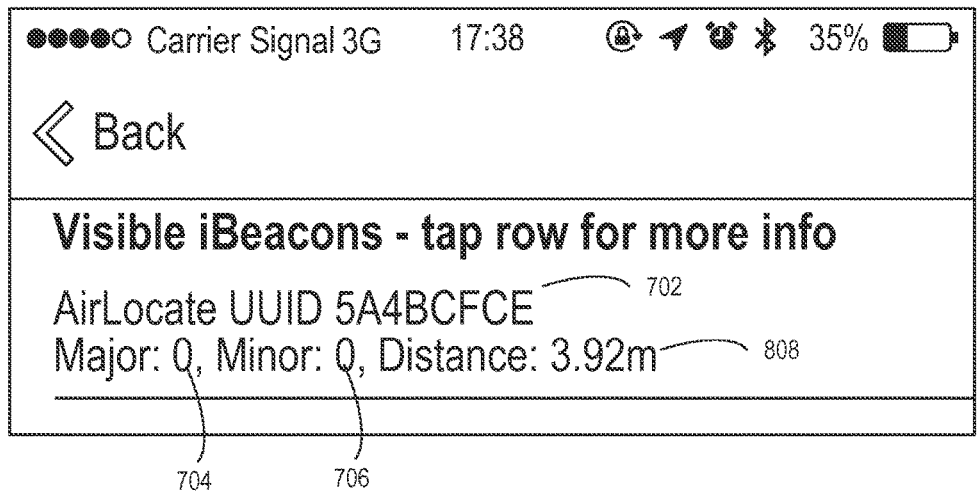
Figure 9:
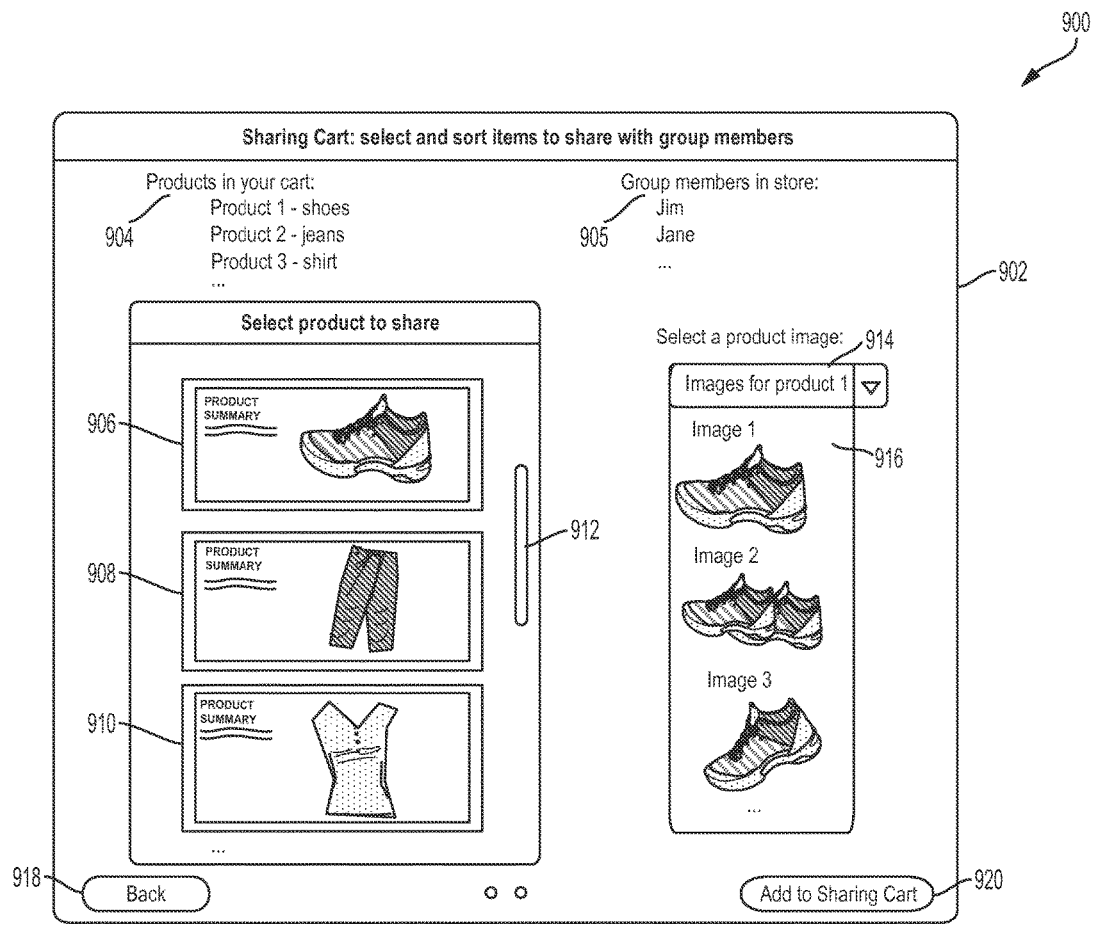
FIG. 9 depicts an example customer interface for selecting items to be placed in a sharing cart while at a real-world shopping venue, in accordance with an embodiment of the present invention.

FIGS. 7 and 8 depict application interfaces for locating beacons in a real-world shopping venue. The interfaces 700 and 800 of FIGS. 7 and 8 can be used to determine the proximity of a client device 108 to a beacon. FIG. 9 depicts an example customer interface for selecting items to be placed in sharing cart while at a real-world shopping venue. The user interfaces (UIs) 700, 800, and 900 depicted in FIGS. 7, 8, and 9 are described with reference to the embodiments of FIGS. 1-6. However, the UIs are not limited to those example embodiments. In embodiments, the UIs can be displayed on display devices of computing devices, such as local server 112 or client devices 108*a-b*. It is to be understood that the user interfaces illustrated in the example embodiments of FIGS. 7-9 can be readily adapted to execute on displays of a variety of computing device platforms running a variety of operating systems that support an interactive user interface.

Throughout FIGS. 7-9, displays are shown with various icons, buttons, links, command regions, windows, toolbars, menus, and drop down lists that are used to initiate action, invoke routines, define clothing items to analyze, select complimentary color schemes for the clothing items, search for assets, select assets, simulate display of selected assets, or invoke other functionality. The initiated actions include, but are not limited to, selecting an asset to be displayed, selecting compatible colors, and other campaign administrative actions. For brevity, only the differences occurring within the figures, as compared to previous or subsequent ones of the figures, are described below.

As shown in FIGS. 7 and 8, UI 700 and 800 can be used to locate a beacon in a real-world shopping venue. In the example of FIGS. 7 and 8, the beacons are iBeacons that use the Bluetooth Low Energy (BLE) network technology. As would be readily apparent to one of ordinary skill in the art, BLE is used to transmit data over relatively short distances. BLE communication comprises of advertisements of small packets of data that are broadcast at regular intervals through radio waves. BLE broadcasting is a one-way communication method in that it simply advertises its packets of data. These data packets can then be picked up by smart devices nearby, such as a client device 108. The beacons can be used for a number of applications, such as retailer's or store's mobile app, to trigger events such as prompts, push notifications, and app actions. Apple Inc. has standardized a format of iBeacon BLE advertising. As shown in FIGS. 7 and 8 an iBeacon's advertising packet is made up of the following three components. The first component is a Universally Unique Identifier (UUID) 702. As seen in UIs 700 and 800, the UUID 702 is a string that distinguishes a company's beacons from others. In certain embodiments, the UUID is a 16-byte string.

The second component is a major value. As shown, major values 704 are a two-byte string. Major values 704 can be used to specify a beacon within a group. For example, if a Best Buy retail store deploys twenty beacons in its store in San Francisco, all of those beacons would have the same major value. In this example, the major value essentially allows Best Buy to know which store their visitors are in.

The third component is a minor value. As shown, minor values 706 are also two-byte strings. Minor values 706 are used to identify specific beacons. For example, a beacon at a Best Buy storefront and another beach in the mobile section of the store would each have their own respective, unique minor values.

The fourth component is a proximity value. As shown, proximity values 708 and 808 can vary as a beacon or a mobile device moves. For example a mobile computing device (e.g., an iOS device) receiving an iBeacon transmission can approximate the distance from the iBeacon. The distance (between transmitting iBeacon and receiving device) can be categorized into 3 distinct ranges: Immediate—within a few centimeters; near—within a couple of meters; and far—greater than 10 meters away and up to 70 meters away. An iBeacon broadcast has the ability to approximate when a visitor or customer has entered, exited, or lingered in a section or region of a store. Depending on a visitor's proximity to a beacon, they are able to receive different levels of interaction at each of these three ranges.

A beacon can work even when the retailer's or stores' app on is hard closed or terminated. For example, beacons can broadcast their UUID, major number, minor number and proximity value and a given mobile app can read these values to decide whether to act or not to act. At the same time, an app can read/act on beacon broadcasted data in all possible states such as, for example:

(1) When app is running, use beacon data to show in-app messages (2) When app is running in background, use beacon data to show push notifications (3) Even when the app is not running, for example, with certain mobile operating systems such as iOS from Apple Inc., an application can listen for beacons even if the app was hard closed. This means the app no longer needs to find ways to prompt a visitor or user to keep an app in background mode. Client devices 108 running iOS can launch this hard closed app in background if it is within the specified range of an iBeacon in which it has registered interest. For this, the retailer's or store's mobile app needs to register UUID of the iBeacons in which it is interested with iOS and when the iOS client device 108 enters in the specified range of these iBeacons. In this example, iOS launches this app in the background, and the app can send notifications to the visitor/user.

Analytics tools such as Adobe® Analytics can provide a number of different methods to identify visitors and their devices. For example, client devices 108 can be identified by their mobile device IDs. One such method is a 'Subscriber ID Method' that identifies a number of HTTP 'subscriber ID headers' that uniquely identify a majority of mobile devices such as client devices 108a-b. Those headers often include the device phone number (or a hashed version of the number), or other identifiers. The majority of current mobile devices have one or more of the headers that uniquely identify the device. These headers contain information on deviceid, clientid, callinglineid for a client device 108.

The example UI 900 of FIG. 9 includes lists 904 and 905, drop down menu 914, and buttons 918 and 920 that a visitor in a store can use to select items to be added to a sharing cart. The UI 900 can be used to sort and prioritize products added to the sharing cart. As shown in FIG. 9 the visitor can view list 904 to select items that are in the visitor's physical shopping cart. Items can be selected from list 904 to be added to a sharing cart. After selecting an item in list 904, the Add to Sharing Cart button 920 can be selected to add the selected item to the visitor's sharing cart. In the example of FIG. 9, group members to share items with can be selected via list 905. In UI 900, the sequence or priority for products to be shared can be selected dragging and dropping product objects 906, 908, 910. UI 900 can provide an 'add to sharing cart' option to the visitor as he explores various items on an in-store screen. While the visitor is exploring items using UI 900, the visitor can add items from list 904 to his sharing cart; drag and drop product objects corresponding to the added items added to the sharing cart to reflect his ranking or preference for the items; and press or select the Add to Sharing Cart button 920 to send a push notification to another member of his group (e.g., a member selected from list 905). This will prompt the other member to go to a nearby in-store screen (i.e., another in-store screen in a section of the store where the other member is shopping. As shown in FIG. 9, the product objects 906, 908, 910 each include a thumbnail of a product image and a product summary. The visitor can navigate to other product objects using scroll bar 912. The UI 900 enables a visitor user to select alternative product images for shared products by selecting product images 916 from drop down menu 914. In an additional or alternative embodiment, a scaled down version of the UI 900 can be rendered by a store's mobile app on the client device 108 of the visitor.

Example Computer System Implementation

Figure 10:
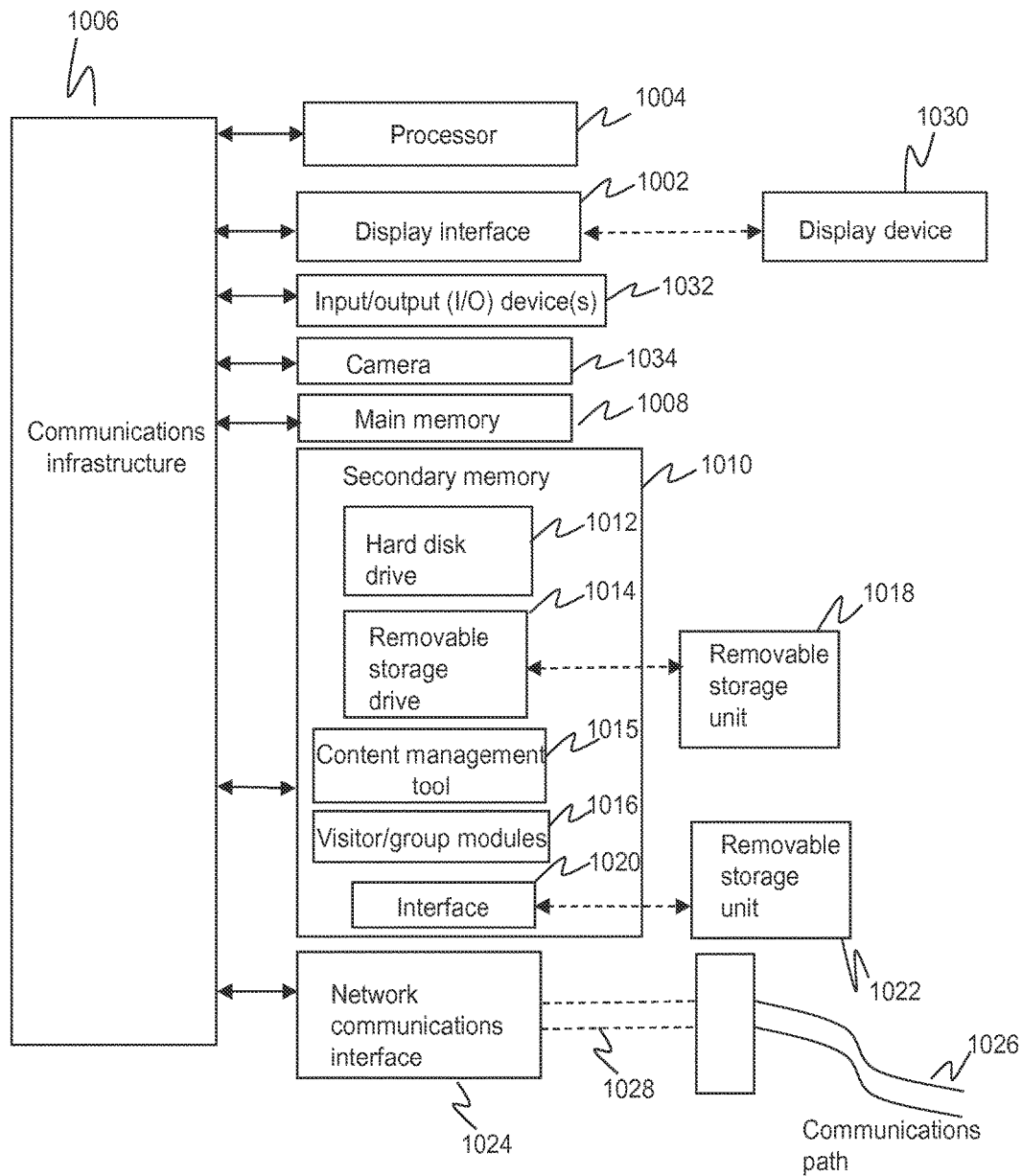
FIG. 10 is a diagram of an example computer system in which embodiments of the present disclosure can be implemented.

Although example embodiments have been described in terms of apparatuses, systems, services, and methods, it is contemplated that certain functionality described herein may be implemented in software on microprocessors, such as a microprocessor chip included in computing devices such as the computer system 1000 illustrated in FIG. 10. In various embodiments, one or more of the functions of the various components may be implemented in software that controls a computing device, such as computer system 1000, which is described below with reference to FIG. 10.

To implement the various features and functions described above, some or all elements of the devices (e.g., client devices 108a-b and interactive displays 114a-b) and servers (e.g., servers 102 and 112) may be implemented using elements of the computer system of FIG. 10. More particularly, FIG. 10 illustrates an example computer system 1000 for implementing the techniques in accordance with the present disclosure.

Aspects of the present invention shown in FIGS. 1-9, or any part(s) or function(s) thereof, may be implemented using hardware, software modules, firmware, tangible computer readable media having logic or instructions stored thereon, or a combination thereof and may be implemented in one or more computer systems or other processing systems.

FIG. 10 illustrates an example computer system 1000 in which embodiments of the present invention, or portions thereof, may be implemented as computer-readable instructions or code. For example, some functionality performed by system 100 shown in FIG. 1 can be implemented in the computer system 1000 using hardware, software, firmware, non-transitory computer readable media having instructions stored thereon, or a combination thereof and may be implemented in one or more computer systems or other processing systems. Hardware, software, or any combination of such may embody certain modules and components used to implement system 100 and server 102 illustrated by FIGS. 1 and 2 discussed above. Similarly, hardware, software, or any combination of such may embody certain modules and components used to implement steps in the flowchart illustrated by FIGS. 5 and 6 discussed above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor 'cores.'

Various embodiments of the invention are described in terms of this example computer system 1000. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 1004 may be a special purpose processor device. As will be appreciated by persons skilled in the relevant art, processor device 1004 may also be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme. In certain embodiments, a processor of one or more of the computing devices and servers described above with reference to FIG. 1 can be embodied as the processor device 1004 shown in FIG. 10.

Computer system 1000 also includes a main memory 1008, for example, random access memory (RAM), and may also include a secondary memory 1010. Secondary memory 1010 may include, for example, a hard disk drive 1012, a removable storage drive 1014. Removable storage drive 1014 may comprise a floppy disk drive, a magnetic tape drive, an optical disk drive, a flash memory, or the like. In non-limiting embodiments, one or more of the memories of digital signage devices and servers discussed above with reference to FIG. 1 can be embodied as the main memory 1008 shown in FIG. 10.

The removable storage drive 1014 reads from and/or writes to a removable storage unit 1018 in a well known manner. Removable storage unit 1018 may comprise a floppy disk, magnetic tape, optical disk, etc. which is read by and written to by removable storage drive 1014. As will be appreciated by persons skilled in the relevant art, removable storage unit 1018 includes a non-transitory computer readable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or EEPROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 may be in the form of signals, which may be electronic, electromagnetic, optical, or other signals capable of being received by communications interface 1024. These signals may be provided to communications interface 1024 via a communications path 1026. Communications path 1026 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 1008 and secondary memory 1010, which can be memory semiconductors (e.g., DRAMs, etc.). Computer readable medium and non-transitory computer readable medium can also refer to removable storage unit 1018, removable storage unit 1022, and a hard disk installed in hard disk drive 1012. Signals carried over communications path 1026 can also embody the logic described herein. These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor device 1004 to implement the processes of the present invention, such as the steps in the methods illustrated by the flowcharts of FIGS. 5 and 6, discussed above. Accordingly, such computer programs represent controllers of the computer system 1000. Where the invention is implemented using software, the software may be stored in a computer program product and loaded into computer system 1000 using removable storage drive 1014, interface 1020, and hard disk drive 1012, or communications interface 1024.

In an embodiment, screens of interactive displays 114*a-b*, 314*a-b*, and 414*a-b* of FIGS. 1, 3, and 4 used to display content and the user interfaces shown in FIGS. 4 and 7-9 may be a computer display 1030 shown in FIG. 10. The computer display 1030 of computer system 1000 can be implemented as a touch sensitive display (i.e., a touch screen). The computer display 1030 can connect to communications infrastructure via display interface 1002 to display electronic content such as interfaces shown in FIGS. 4 and 7-9. For example, the computer display 1030 can be an in-store interactive display 114 (e.g., a large in-store screen) used to display electronic content such as product images and items in a shared cart. Also, for example, computer display 1030 can be used to display the user interfaces shown in FIGS. 4 and 7-9. As shown in FIG. 10, computer system 1000 can also include an input device 1032 and a camera 1034. In an embodiment, camera 1034 can be a camera associated with display 1030. For instance, camera 1034 can be a camera integrated with display 1030 or mounted on top of display 1030. Camera 1034 can be a webcam or any other suitable video camera capable of capturing video frames of people viewing display 1030. For example, cameras 120a-b shown in FIG. 1 can be implemented as camera 1034.

In the non-limiting example shown in FIG. 10, secondary memory 1010 includes a content management tool 1015 and an asset modeler 1016. Content management tool 1015 and asset modeler 1016 can be implemented as computer programs stored in secondary memory 1010.

According to one example, content management tool 1015 can be a tool included in a content management system, such as, for example, Adobe® Experience Manager. By using content management tool 1015, a retailer or administrator 118 can manage content for a store's website or the store's advertising campaign. Content management tool 1015 can be used to select and modify product content, and can include an administrator interface for selecting product images and editing product descriptions and offers.

Visitor and group modules 1016 can include the visitor and group identification modules 202 and 204 as shown in the example of FIG. 2, discussed above. The visitor and group modules 1016 can further include the context information module 206 and use data stored in the visitor profiles 208 and group profiles 210 shown in FIG. 2.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method for coordinating communications between mobile devices based on locations within a real-world shopping venue, the method comprising:
    identifying, by a processing device, a physical action of a visitor with respect to a physical product at the real-world shopping venue, wherein the physical action is identified based on communications with a first sensor or camera in a first location within the real-world shopping venue;
    identifying, by the processing device, the visitor based at least in part on the identified physical action and previously collected visitor information associated with the real-world shopping venue;
    determining, by the processing device and based at least in part on the previously collected visitor information, that the visitor is a member of a group;
    configuring, by the processing device, an interactive display device to present an interactive interface;
    adding, by the processing device and to a sharing cart data object, electronic data describing one or more physical products at the first location;
    determining, by the processing device, that a mobile device associated with a member of the group is positioned in a second location within the real-world shopping venue, wherein said determining is based on communication with a second sensor or camera in the second location; and
    transmitting, by the processing device, a notification to the mobile device at the second location, the notification identifying that the visitor added the electronic data describing the one or more physical products to the sharing cart data object while the visitor is present at the real-world shopping venue.

2. The method of claim 1, wherein identifying the physical action comprises determining the first location using the first sensor or camera, wherein the first sensor or camera comprises a beacon, Radio Frequency Identification (RFID) device, or Near Field Communication (NFC) device in the real-world shopping venue to send or receive signals with an additional mobile device associated with the visitor, wherein a location of the beacon, RFID device, or NFC device when the signals are sent or received is used to determine the first location.

3. The method of claim 1, wherein identifying the physical action comprises identifying that the visitor interacted with a particular product based on a beacon attached to the particular product, the beacon including an accelerometer.

4. The method of claim 1, wherein the group is one or more of a couple, a family, or a household.

5. The method of claim 1, wherein determining that the visitor is a member of the group comprises:
    determining, based on the previously collected visitor information, that the visitor and at least one member of the group visited the real-world shopping venue more than a threshold number of times in a duration.

6. The method of claim 5, wherein determining that the visitor and the at least one member of the group visited the real-world shopping venue more than the threshold number of times in the duration comprises:
    determining that the visitor and the at least one member of the group entered or exited the real-world shopping venue at substantially the same time more than the threshold number of times.

7. The method of claim 1, wherein determining that the visitor is a member of the group is based at least in part on collected Global Positioning System (GPS) coordinates of one or more devices associated with the visitor and at least one member of the group.

8. The method of claim 1, wherein determining that the visitor is a member of the group is based at least in part on determining that the visitor and at least one member of the group used a common physical shopping cart at the real-world shopping venue more than a threshold number of times in a duration.

9. The method of claim 1, wherein determining that the visitor is a member of the group is based at least in part on determining that the visitor and at least one member of the group used a common payment means at the real-world shopping venue more than a threshold number of times in a duration.

10. The method of claim 1, wherein the first sensor or camera is a still camera or a video camera, wherein identifying the visitor is based on one or more of:
    a visitor image from the still camera or the video camera;
    a visitor activity determined based on interpreting images from the still camera or the video camera;
    information from an Internet of Things (loT)-type sensor;
    information from a beacon; or
    information from a Radio Frequency Identification (RFID) chip.

11. The method of claim 1, wherein the previously collected visitor information comprises:
    images from one or more cameras;
    information from one or more IoT-type sensors;
    information from one or more beacons; and
    information from one or more RFID chips.

12. A system comprising:
    a processor;
    an interactive display device;
    a first sensor or camera in a first location within a real-world shopping venue;
    a second sensor or camera in a second location within the real-world shopping venue; and
    a memory having instructions stored thereon, that, if executed by the processor, cause the processor to perform operations comprising:
        identifying, based on communications with the first sensor or camera, a physical action of a visitor with respect to a physical product at the real-world shopping venue,
        identifying the visitor based at least in part on the identified physical action and previously collected visitor information associated with the real-world shopping venue;
        determining, based at least in part on the previously collected visitor information, that the visitor is a member of a group;
        configuring the interactive display device to present an interactive interface;
        adding, to a sharing cart data object, electronic data describing one or more physical products at the first location;

determining, based on communication with a second sensor or camera in the second location, that a mobile device associated with a member of the group is positioned in the second location; and transmitting a notification to the mobile device at the second location, the notification identifying that the visitor added the electronic data describing the one or more physical products to the sharing cart data object while the visitor is present at the real-world shopping venue.

13. The system of claim 12, wherein the notification is sent to the member of the group while the visitor and the member of the group are present at the real-world shopping venue, wherein a display device is present at the real-world shopping venue, the operations further comprising displaying, on the display device, the notification.

14. The system of claim 12, wherein identifying the physical action comprises identifying that the visitor interacted with a particular product based on a beacon attached to the particular product, the beacon including an accelerometer.

15. The system of claim 12, wherein determining that the visitor is a member of the group comprises:
determining, based on the previously collected visitor information, that the visitor and at least one member of the group visited the real-world shopping venue together more than a threshold number of times in a duration.

16. The system of claim 12, wherein determining that the visitor is a member of the group is based at least in part on collected Global Positioning System (GPS) coordinates of one or more devices associated with the visitor and at least one member of the group.

17. A computer readable storage medium having executable instructions stored thereon, that, if executed by a computing device in a real-world shopping venue, cause the computing device to perform operations, the instructions comprising:
instructions for identifying, based on communications with a first sensor or camera in a first location within the real-world shopping venue, a physical action of a visitor with respect to a physical product at the real-world shopping venue;
instructions for identifying the visitor based at least in part on the identified physical action and previously collected visitor information associated with the real-world shopping venue;
instructions for determining, based at least in part on the previously collected visitor information, that the visitor is a member of a group;
instructions for configuring an interactive display device to present an interactive interface;
instructions for adding, to a sharing cart data object, electronic data describing one or more physical products at the first location;
instructions for determining, based on communication with a second sensor or camera in a second location, that a mobile device associated with a member of the group is positioned in the second location within the real-world shopping venue; and
instructions for transmitting a notification to mobile device at the second location, the notification identifying that the visitor added the electronic data describing the one a or more physical products to the sharing cart data object while the visitor is present at the real-world shopping venue.

18. The computer readable storage medium of claim 17, wherein the first sensor or camera comprises a beacon, wherein the instructions for identifying the physical action comprise instructions for identifying that the visitor interacted with a particular product based on the beacon, the beacon attached to the particular product, and including an accelerometer.

19. The computer readable storage medium of claim 17, wherein the instructions for determining that the visitor is a member of the group comprise:
instructions for determining, based on the previously collected visitor information, that the visitor and at least one member of the group visited the real-world shopping venue together more than a threshold number of times in a duration.

20. The computer readable storage medium of claim 17, wherein the previously collected visitor information comprises:
images from one or more cameras;
information from one or more IoT-type sensors;
information from one or more beacons; and
information from one or more Radio Frequency Identification (RFID) chips.

* * * * *